(12) United States Patent
Makino et al.

(10) Patent No.: US 7,675,760 B2
(45) Date of Patent: Mar. 9, 2010

(54) POWER SUPPLY

(75) Inventors: Jun Makino, Singapore (SG);
Zhongfang Wang, Singapore (SG)

(73) Assignee: Creative Technology Ltd., Singapore (SG)

( * ) Notice: Subject to any disclaimer, the term of this patent is extended or adjusted under 35 U.S.C. 154(b) by 191 days.

(21) Appl. No.: 11/908,933

(22) PCT Filed: Mar. 15, 2006

(86) PCT No.: PCT/SG2006/000058

§ 371 (c)(1),
(2), (4) Date: Sep. 17, 2007

(87) PCT Pub. No.: WO2006/098702

PCT Pub. Date: Sep. 21, 2006

(65) Prior Publication Data

US 2008/0205102 A1     Aug. 28, 2008

Related U.S. Application Data

(63) Continuation-in-part of application No. 11/083,665, filed on Mar. 17, 2005, now abandoned.

(51) Int. Cl.
*H02M 3/335* (2006.01)
(52) U.S. Cl. .................. 363/21.08; 363/21.04
(58) Field of Classification Search .............. 363/21.08, 363/21.04, 21.12
See application file for complete search history.

(56) References Cited

U.S. PATENT DOCUMENTS

| | | | | |
|---|---|---|---|---|
| 4,885,673 A | * | 12/1989 | Philippe | 363/21.05 |
| 5,126,930 A | * | 6/1992 | Ahn | 363/21.05 |
| 5,412,556 A | * | 5/1995 | Marinus | 363/21.05 |
| 6,069,798 A | | 5/2000 | Liu | |
| 6,098,175 A | | 8/2000 | Lee | |
| 6,295,212 B1 | | 9/2001 | Kayser et al. | |

(Continued)

FOREIGN PATENT DOCUMENTS

EP     1555740 A2     7/2005

(Continued)

OTHER PUBLICATIONS

McGarry, Laurence; The Standby Power Challenge; International IEEE Conference On Asian Green Electronics (AGEC), 2004, pp. 56-62.

(Continued)

*Primary Examiner*—Shawn Riley

(57) ABSTRACT

A power supply (V1) for an electrical device comprising a transformer (X1) having primary and secondary windings. The primary winding is connectable to an AC voltage supply and circuitry on the secondary side is arranged to provide a DC output voltage for the electrical device. The power supply also comprises a switch (111—transistors Q1 & Q2) between the primary winding of the transformer and the AC supply, and a rectifier (Diode D6) for rectifying the AC voltage. The switch is arranged to switch on at some point as the rectified AC voltage increases, once it has reached a non-zero value, thereby providing a current flow through the primary winding and hence through the secondary winding when the switch (111—transistors Q1 & Q2) is switched off. The switch is further arranged to switch off before the rectified AC voltage starts to increase again.

22 Claims, 18 Drawing Sheets

U.S. PATENT DOCUMENTS 7,218,532 B2 * 5/2007 Choi et al. ............... 363/21.01

FOREIGN PATENT DOCUMENTS

GB 2261779 A 5/1993
GB 2334160 A 8/1999

OTHER PUBLICATIONS

Nielsin, Nils; Optimizing Efficiency On Conventional Transformer Based Low Power AC/DC Standby Power Supplies; IEEE 2004, pp. 313-317.

Mozar, Stefan, Intelligent Standby Concept; IEEE Transactions On Consumer Electronics, vol. 46, No. 1, Feb. 2000, pp. 179-182.

* cited by examiner

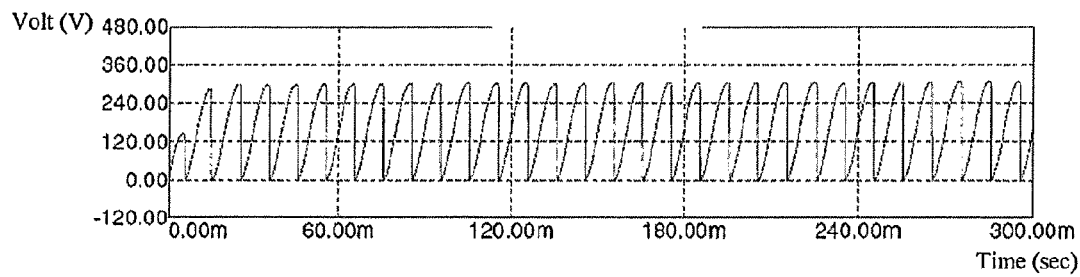
Figure 3: Voltage at node 200
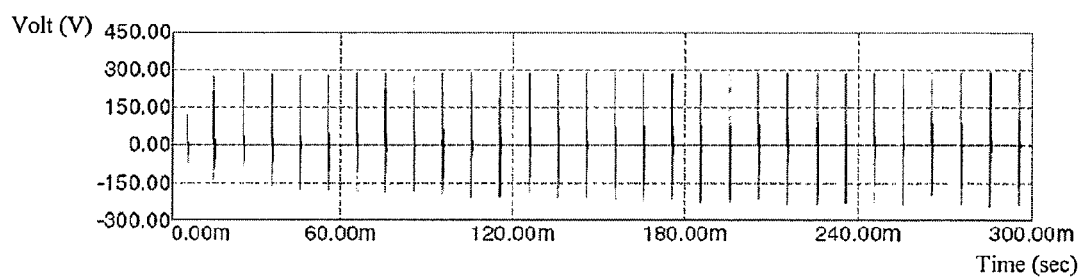
Figure 4a: Voltage across primary winding
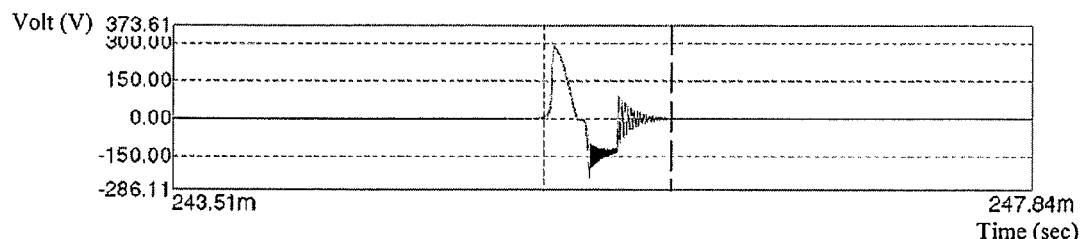
Figure 4b: Magnified view of Fig. 4a

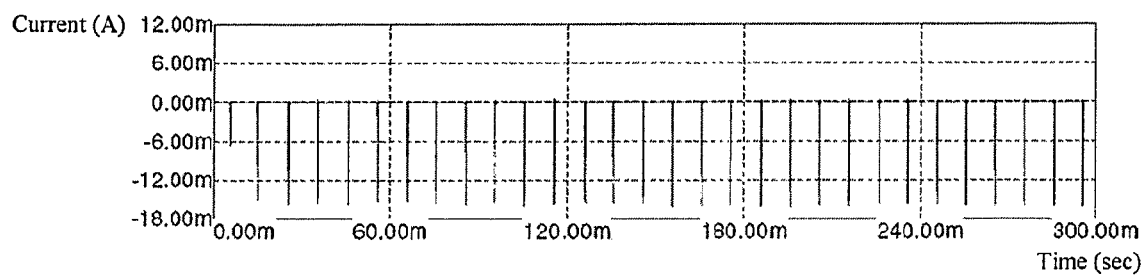
Figure 5a: Current through primary winding
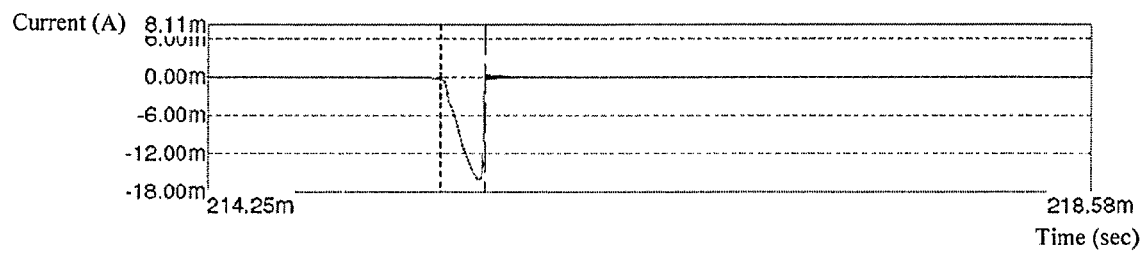
Figure 5b: Magnified view of Fig. 5a

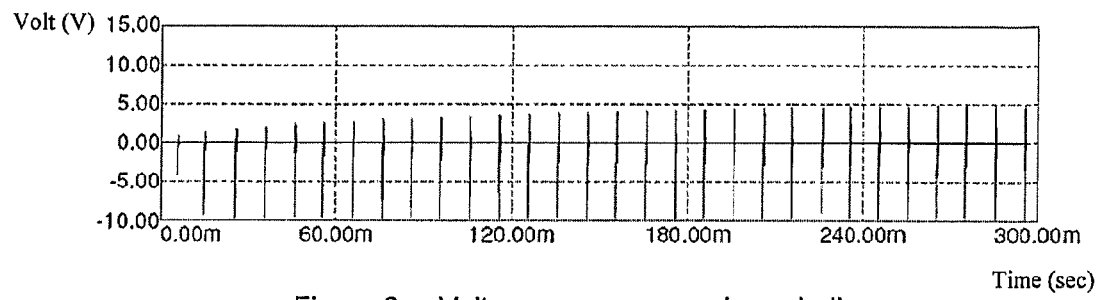
Figure 6a: Voltage across secondary winding
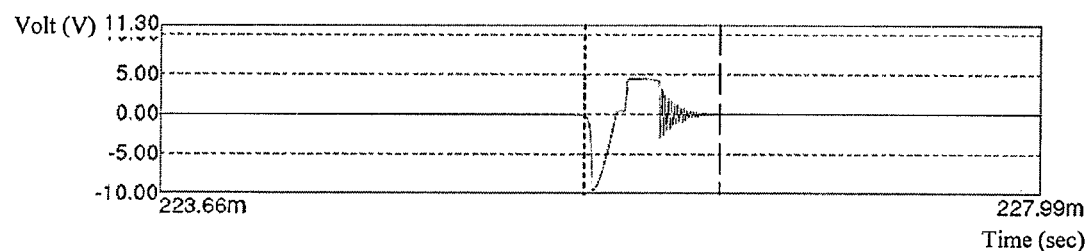
Figure 6b: Magnified view of Fig. 6a
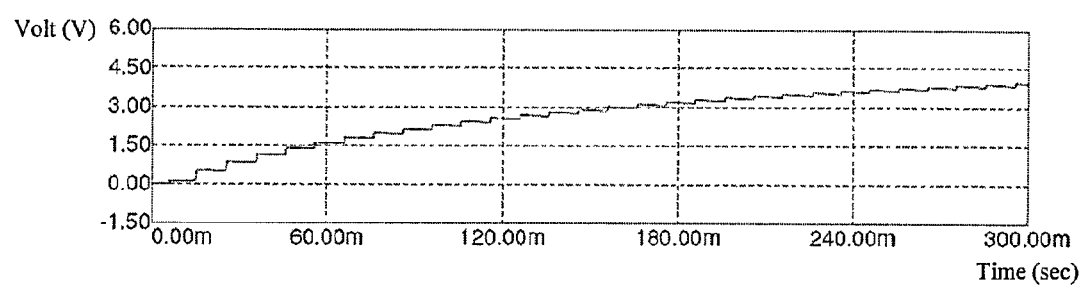
Figure 7: Voltage at node 206

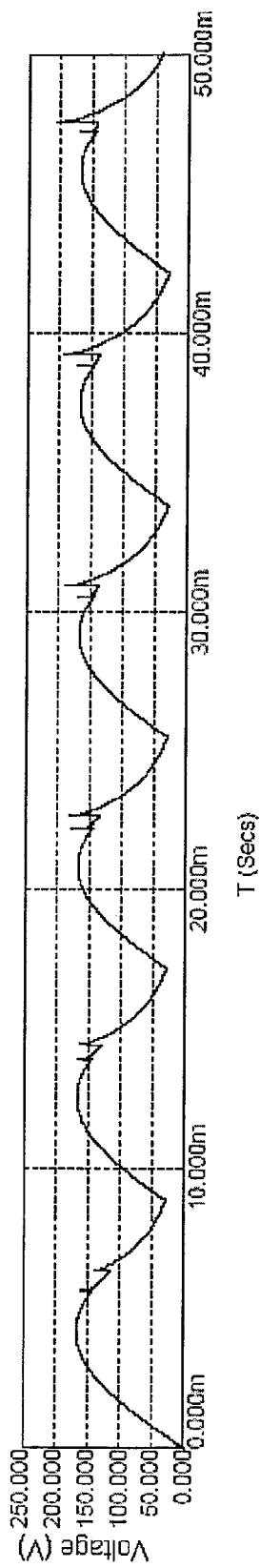
Figure 15: Voltage at node 200
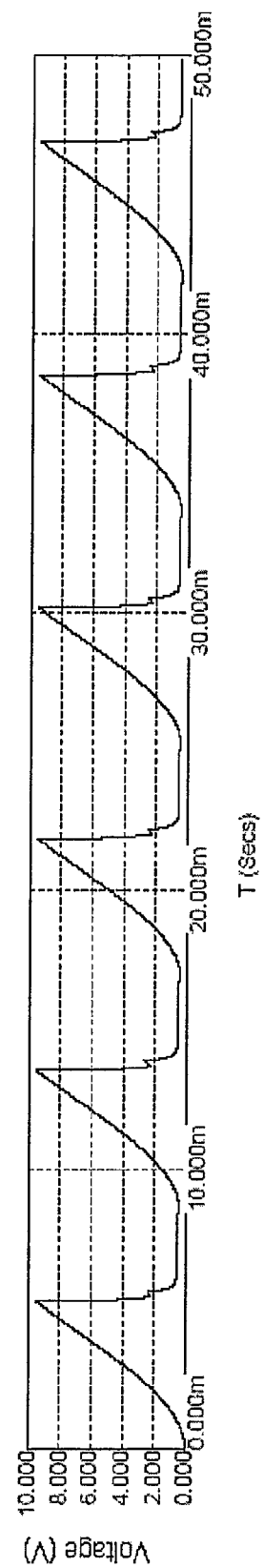
Figure 16: Voltage at node 201

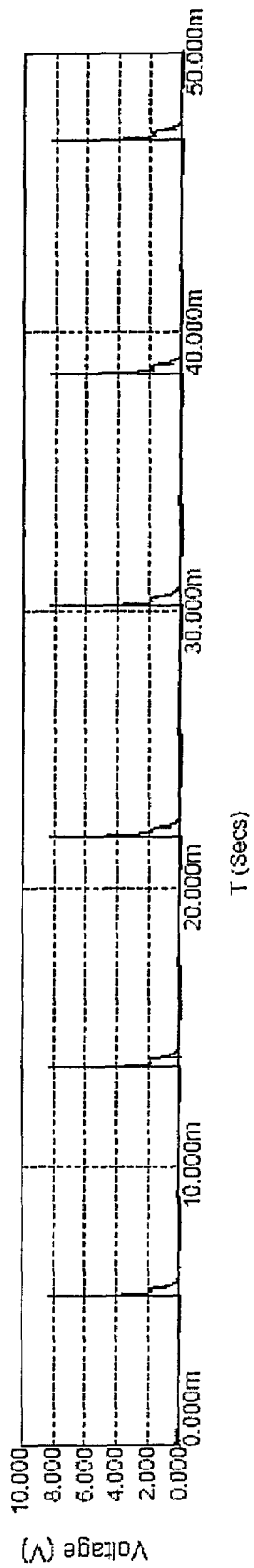
Figure 17: Voltage at node 202
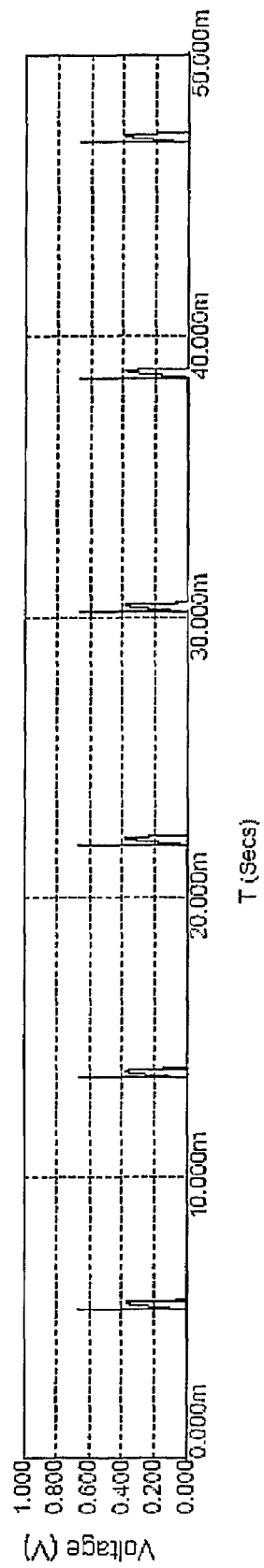
Figure 18: Voltage at node 203

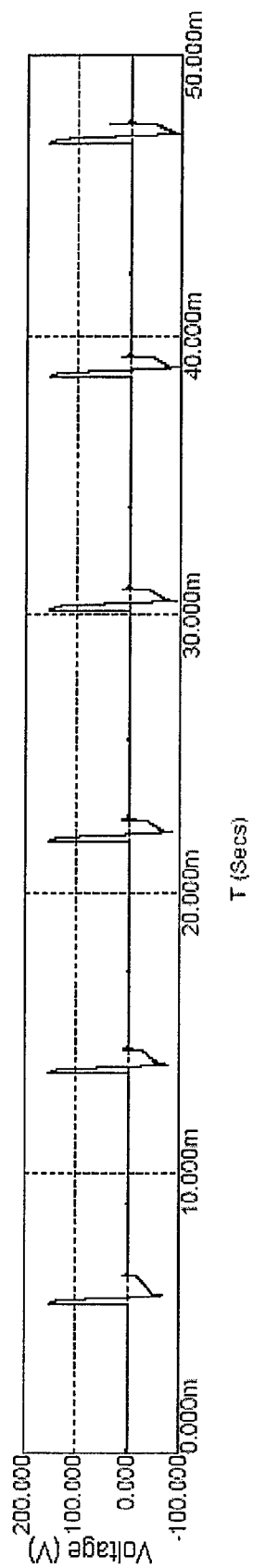
Figure 19: Voltage across primary winding of transformer T1
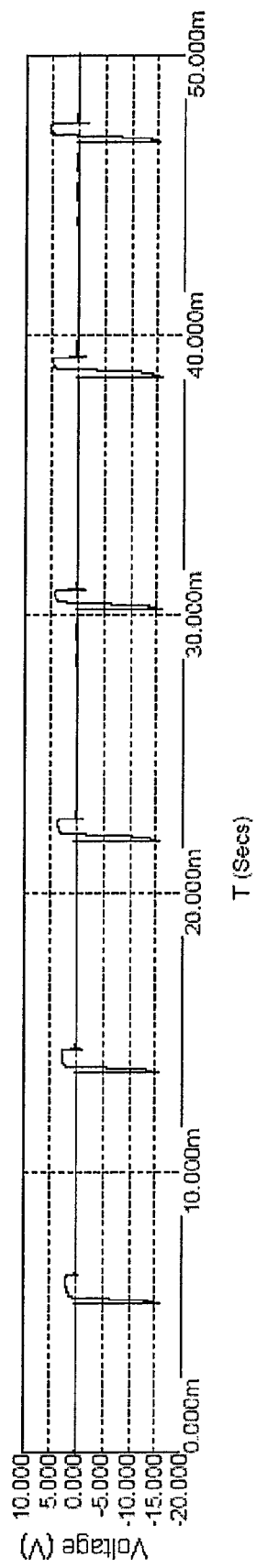
Figure 20: Voltage across secondary winding of transformer T1

POWER SUPPLY

FIELD OF THE INVENTION

The invention relates to a power supply for an electrical device and a method for supplying power to an electrical device. In particular, the invention relates to a power supply which has low power consumption.

BACKGROUND OF THE INVENTION

It is becoming increasingly important to conserve energy and reduce power losses and power supplies with low power consumption are becoming more and more important. Such power supplies find applications in many situations, for example as standby power supplies in electrical devices (e.g. in televisions, washing machines), within external power supplies for supplying power to detect whether the electrical device is connected or not and to switch on the main power supply (e.g. within a portable telephone charger where the telephone is placed in a cradle for charging) or as standalone power supplies for electrical devices that require low power consumption, including low power external power supplies (e.g. a night light, plugged into the AC wall socket, to provide dim lighting).

In a first known arrangement, a power supply (used in a number of applications) comprises a transformer, the primary winding of which is connected directly to an AC power supply, the secondary winding of which provides an output voltage for the electrical device. To have low power consumption for this arrangement, the current through the primary winding of the transformer (which is connected directly to the AC supply) must be small. In order to have a small current, the impedance of the primary winding, as seen by the AC supply, must be large. With a typical AC supply frequency of 50 or 60 Hz, to have a large impedance in the primary winding, a large inductance will be required. To obtain such a large inductance in the primary winding, more turns are required, which will make the transformer impractically large. Alternatively, to avoid a large transformer, the wire used for the turns can be made thinner, but this means higher resistance which, in turn, means more losses. Essentially, to have a very low power consumption in this arrangement, we need a perfect inductor of high inductance and this is just not feasible.

A second known arrangement is known as a switching mode power supply (SMPS) and there are several different implementations of SMPS. Whilst SMPS provides advantages over the first arrangement, the rapid switching in that arrangement creates a large amount of noise. Also, SMPS are more complex in design and are more costly.

Currently, standby power supplies, such as those described above, typically have a power consumption of several hundred milliwatts or even as high as several watts. However, a typical power requirement of control circuits to "wake up" a device from standby can be as low as only a few milliwatts. So there is a big mismatch between the actual power required for a device in standby mode and the power consumed.

SUMMARY OF THE INVENTION

According to a first aspect of the invention there is provided a power supply for an electrical device, the power supply comprising:

a) a transformer comprising a primary winding on a primary side and a secondary winding on a secondary side, the primary winding being connectable to an AC voltage supply and circuitry on the secondary side being arranged to provide a DC output voltage for the electrical device;

b) a switch between the primary winding of the transformer and the AC voltage supply; and c) a rectifier for rectifying the AC voltage;

wherein the switch is arranged to switch on at some point as the rectified AC voltage increases from zero to a maximum and once the rectified AC voltage has increased to a non-zero value, thereby providing a current flow through the primary winding and hence a current flow through the secondary winding, and wherein the switch is arranged to switch off before the rectified AC voltage starts to increase again.

In this arrangement, there is no current drain through the transformer windings until the switch is switched on. Once the switch is switched on, current flows through the primary winding and consequently, energy is stored in the primary winding. The non-zero value reached by the rectified AC voltage is preferably a significant proportion of the peak voltage and, even more preferably the peak voltage.

The circuit may further include a current limiter. The current limiter limits the current flow through the primary winding so that power consumption can be controlled.

The AC power supply is typically the mains power supply, for example at 110 VAC, 120 VAC, 230 VAC or 240 VAC at 50 or 60 Hz.

In one preferred embodiment, the apparatus further comprises a switch timer for switching the switch on and off. The switch timer may be arranged to switch the switch on at some point as the rectified AC voltage increases from zero to a maximum. The switch timer may be arranged to switch the switch off before the rectified AC voltage starts to increase again.

The switch timer may be an RC timer comprising a resistor and capacitor between a node, whose voltage matches the rectified AC voltage, and ground. In that case, the capacitor may be arranged to charge up as the rectified AC voltage increases from zero to a maximum. When the switch is switched on, the capacitor may be discharged, the energy stored in the capacitor being transferred to the primary winding.

The switch is preferably arranged to switch on close to each peak of the rectified AC voltage. If the apparatus comprises a RC switch timer, the value of the resistor and capacitor may be chosen such that the switch switches on close to each peak of the rectified AC signal. This maximizes the current through the primary winding of the transformer, by providing a maximized voltage across it when the switch is switched on.

The switch timer may be coupled to a switch controller. In one embodiment, the switch comprises a MOSFET. In one preferred embodiment, the switch timer is coupled to a switch controller and the switch comprises a MOSFET, and the switch controller comprises a thyristor device for switching on and off the MOSFET.

In one embodiment, the current limiter comprises at least one charge storage device. In a preferred embodiment, the current limiter comprises two charge storage devices. Each charge storage device may be a capacitor. The value of the capacitor or capacitors may be chosen appropriately to limit the current flow through the primary winding to a desired current level.

The power supply may be arranged such that current stops flowing through the primary winding once the at least one charge storage device of the current limiter has substantially fully charged i.e. the switch may be arranged to switch off once the charge storage device or devices of the current limiter have substantially fully charged. If the arrangement includes a switch timer, the switch timer may be arranged to switch the switch off once the charge storage device or devices of the current limiter have fully charged and this preferably takes place at some point as the rectified AC signal decreases from its peak to zero. Once the switch is switched off, no current flows through the windings of the transformer so, as already mentioned, the amount of current flow through the windings can be controlled by setting the value of the charge storage device or devices of the current limiter appropriately.

In one embodiment, the switch timer is operable with a switch timer reset, the switch timer reset being arranged to reset the switch timer after the switch has been switched off i.e. once current has stopped flowing through the transformer windings. Resetting the switch allows the switch to switch on again when the rectified AC signal is increasing from zero to its next maximum. If the switch timer is an RC timer, the switch timer may be reset once the capacitor has fully discharged, which may occur as the rectified AC voltage decreases from its maximum to zero.

In another embodiment, the current limiter may be omitted from the power supply as current flow may be controlled by the thyristor device.

Thus, in one preferred embodiment, operation is as follows. As the rectified AC voltage increases from zero to a maximum, the capacitor of the RC switch timer is charging up and once it has charged a certain amount, which preferably coincides with the peak of the rectified AC voltage, the switch timer switches the switch on, thereby providing a current flow through the windings corresponding to in rush of current from the AC supply and, less importantly, discharge of the RC switch timer capacitor. Along with the current through the windings there is a current flow through the charge storage device or devices of the current limiter. As the current flows through the windings, the charge storage device or devices of the current limiter charge up and, once fully charged, the switch switches off, so that current stops flowing through the windings and power consumption is limited. Once the RC switch timer capacitor has fully discharged, by transferring its stored energy across the windings, the switch timer is reset. This takes place as the rectified AC signal falls from its maximum to zero once again so that the switch is ready to switch on as the rectified AC voltage increases once again.

In one preferred embodiment, the switch is arranged to use positive feedback to effect fast switching from off to on. The fast switching from off to on means that the time for a voltage to drop across the switch is minimized and this reduces power loss in the switch itself.

In that embodiment, the switch may comprise a first transistor and a second transistor, the collector of the first transistor being coupled to the base of the second transistor. In addition, the collector of the second transistor may be coupled to the base of the first transistor and this may be via a feedback capacitor. This arrangement may provide positive feedback because, as the voltage at the collector of the second transistor rises, the voltage at the base of the first transistor rises too, which further increases the voltage at the second transistor collector and so on.

The power supply may further comprise a voltage limiter for preventing breakdown of the device at high voltages. The voltage limiter may comprise a charge storage device arranged to charge up as the rectified AC voltage increases from zero to a maximum. The charge storage device may be a high voltage capacitor.

In one preferred embodiment of the invention, the rectifier is arranged to full-wave rectify the AC voltage. This means that the rectified AC voltage increases from zero to a peak twice in every cycle of the original AC signal.

Although a preferred embodiment, where the rectifier full-wave rectifies the AC voltage, has been described, it is of course possible that the rectifier only half-wave rectifies the AC voltage. In that case, the rectified AC voltage will go from zero to a maximum only once in each AC cycle.

The circuitry on the secondary side may provide the DC output voltage for the electrical device via a charge storage device (e.g. a capacitor) which charges up during each AC cycle. In that arrangement, the capacitor is preferably located between ground and an output node so that, as the capacitor charges up during each AC cycle, the voltage at the output node increases towards a steady state DC voltage.

The power supply may further comprise circuitry for reducing electromagnetic emission caused by the switching of the switch between on and off modes.

Electromagnetic emission (known as ringing) may be caused by the rapid on and off switching and this can be reduced by the use of appropriate circuitry. In one embodiment, the circuitry comprises a capacitor and a resistor appropriately positioned between the secondary winding and the output node.

The power supply may further comprise a regulator for regulating the DC output voltage. This is useful when the load requires a particularly steady DC voltage supply. The regulator may be located between the output voltage and the switch and may be arranged to switch the switch off if the output voltage exceeds a selected threshold. The regulator may comprise a zener diode.

According to the invention, there is also provided an electrical device comprising a power supply as described above.

According to the first aspect of the invention, there is also provided a power supply for an electrical device, the power supply comprising:

a) a transformer comprising a primary winding on a primary side and a secondary winding on a secondary side, the primary winding being connectable to an AC voltage supply and circuitry on the secondary side being arranged to provide a DC output voltage for the electrical device;

b) a switch between the primary winding of the transformer and the AC voltage supply;

c) a rectifier for full wave rectifying the AC voltage; and d) a current limiter comprising a first capacitor and a second capacitor;

wherein the switch is arranged to switch on at some point as the rectified AC voltage increases from zero to a maximum in each half cycle of the rectified AC voltage and once the rectified AC voltage has reached a non-zero value, thereby providing a current flow through the primary winding and hence a current flow through the secondary winding, wherein the current limiter is arranged to limit the amount of current flowing through the primary winding by stopping the current flowing through the primary winding when the first and second capacitors are fully charged, and wherein the switch is arranged to switch off as the rectified AC voltage decreases from a maximum to zero in each half cycle of the rectified AC voltage.

According to a second aspect of the invention, there is provided a method for supplying power to an electrical device, the method comprising the steps of:

a) providing a transformer having a primary winding and a secondary winding, the primary winding being connected to an AC voltage supply via a switch;

b) providing a rectifier for rectifying the AC voltage;
c) as the rectified AC voltage increases from zero to a maximum, once the rectified AC voltage has increased to a non zero value, switching on the switch to provide a current flow through the primary winding and hence a current flow through the secondary winding;
d) converting the current flow through the secondary winding to a DC output voltage for the electrical device; and
e) switching off the switch before the rectified AC voltage starts to increase again.

In this method, there is no current drain through the transformer windings until the switch is switched on. Once the switch is switched on, current from the AC supply is transferred to the primary winding, which provides a big enough voltage drop to provide a DC output voltage for the electrical device. The current flowing through the primary winding is limited by the current limiter, however, so that the power consumption can be controlled.

The AC power supply is typically the mains power supply, for example at 110 VAC, 120 VAC, 230 VAC or 240 VAC at 50 or 60 Hz.

Step c) of switching on the switch may comprise a switch timer switching on the switch. Step e) of switching off the switch may comprise a switch timer switching off the switch. The switch timer may be arranged to switch the switch on at some point as the rectified AC voltage increases from zero to a maximum. The switch timer may be arranged to switch the switch off before the rectified AC voltage starts to increase again.

The switch timer may be an RC timer comprising a resistor and capacitor between a node, whose voltage matches the rectified AC voltage, and ground. In that case, the capacitor may be arranged to charge up as the rectified AC voltage increases from zero to a maximum. When the switch is switched on, the capacitor may be discharged, the energy stored in the capacitor being transferred to the primary winding.

Preferably, step c) of switching on the switch comprises switching on the switch close to each peak of the rectified AC voltage. If the step of switching on the switch comprises a RC switch timer switching on the switch, the value of the resistor and capacitor may be chosen such that the switch switches on at the peak of the rectified AC signal. This maximizes the current through the primary winding of the transformer by providing a maximized voltage across it when the switch is on.

In one embodiment, the current limiter comprises at least one charge storage device. In a preferred arrangement, the current limiter comprises two charge storage devices. The or each charge storage device may be a capacitor.

In one embodiment, step e) of switching off the switch may comprises switching off the switch once the charge storage device or devices of the current limiter have substantially fully charged. If the arrangement includes a switch timer, the switch timer may be arranged to switch the switch off once the charge storage device or devices of the current limiter have fully charged. In that arrangement, once the switched is switched off, no current flows through the windings. Thus, the amount of current drain through the windings can be controlled by setting the size of the charge storage devices appropriately.

The method may further comprise the step of charging up a charge storage device as the rectified AC voltage increases from zero to a maximum, the charge storage device acting as a voltage limiter for preventing breakdown of the device at high voltages. In that case, the energy stored in the charge storage device is transferred to the primary winding of the transformer when the switch is switched on.

In one embodiment, the switch timer is operable with a switch timer reset for resetting the switch timer after the switch has been switched off. If the switch timer is an RC switch timer, the switch timer reset may be arranged to reset the switch once the capacitor of the RC timer has fully discharged. Resetting the switch allows the switch to switch on again as the rectified AC signal increases from zero to a maximum once again.

In one preferred embodiment, the switch is arranged to use positive feedback to effect fast switching from off to on. The fast switching from off to on means that the time for a voltage to drop across the switch is minimized and this reduces power loss in the switch itself.

In that embodiment, the switch may comprise a first transistor and a second transistor, the collector of the first transistor being coupled to the base of the second transistor. In addition, the collector of the second transistor may be coupled to the base of the first transistor and this may be via a feedback capacitor. This arrangement may provide positive feedback because, as the voltage at the collector of the second transistor rises, the voltage at the base of the first transistor rises too, which further increases the voltage at the second transistor collector and so on.

Preferably, the rectifier is arranged to full-wave rectify the AC voltage. This means that the rectified AC voltage increases from zero to a peak twice in every cycle of the original AC signal.

In one embodiment, step d) of converting the voltage peak in the secondary winding to a DC output voltage for the electrical device comprises charging up a capacitor during each AC cycle, the voltage across the capacitor being the DC output voltage. In that arrangement, the capacitor is preferably located between ground and an output node so that, as the capacitor charges up during each AC cycle, the voltage at the output node increases towards a steady state DC voltage.

The method may further comprise the step of regulating the DC output voltage. This is useful when the load requires a particularly steady DC voltage supply. The regulator may be located between the output voltage and the switch and may be arranged to switch the switch off if the output voltage exceeds a selected threshold.

In one embodiment, steps c), d) and e) of the method are repeated until a steady state DC output voltage for the electrical device is obtained.

According to the second aspect of the invention, there is also provided a method for supplying power to an electrical device, the method comprising the steps of:
a) providing a transformer having a primary winding and a secondary winding, the primary winding being connected to a AC voltage supply via a switch;
b) providing a rectifier for full wave rectifying the AC voltage;
c) as the rectified AC voltage increases from zero to a maximum in each half cycle of the rectified AC voltage, once the rectified AC voltage has reached a non-zero value, switching on the switch to provide a current flow through the primary winding and hence a current flow through the secondary winding, the amount of current flowing through the primary winding being limited by a current limiter comprising two capacitors;
d) converting the current flow through the secondary winding to a DC output voltage for the electrical device; and
e) switching off the switch as the rectified AC voltage decreases from a maximum to zero in each half cycle of the rectified AC voltage.

According to the second aspect of the invention, there is also provided a method for supplying power to an electrical device, the method comprising the steps of:
- a) providing a transformer having a primary winding and a secondary winding, the primary winding being connected to a AC voltage supply via a switch;
- b) providing a rectifier for rectifying the AC voltage;
- c) performing the following steps at least once in each AC cycle:
    - i) as the rectified AC voltage increases from zero to a maximum, once the rectified AC voltage has increased to a non zero value, switching on the switch to provide a current flow through the primary winding and hence a current flow through the secondary winding, the amount of current flowing through the primary winding being limited by a current limiter;
    - ii) converting the current flow through the secondary winding to a DC output voltage for the electrical device by charging up an output charge storage device, the voltage across the charge storage device being the DC output voltage; and
    - iv) switching off the switch before the rectified AC voltage starts to increase again, wherein, the output charge storage device steadily charges up such that, after a number of AC cycles, the output charge storage device is substantially fully charged so as to provide a steady state DC output voltage for the electrical device.

According to a third aspect of the invention, there is provided an electrical device connectable to an AC voltage supply and operable in each of normal mode and standby mode, the electrical device comprising:
- a main power supply for providing power during normal mode;
- a control for switching the main power supply on and off; and
- a standby power supply for providing power, during standby mode, to the control for switching on the main power supply, the standby power supply comprising:
- a) a transformer comprising a primary winding on a primary side and a secondary winding on a secondary side, the primary winding being connectable to an AC voltage supply and circuitry on the secondary side being arranged to provide a DC output voltage for the electrical device;
- b) a switch between the primary winding of the transformer and the AC voltage supply; and
- c) a rectifier for rectifying the AC voltage;

wherein the switch is arranged to switch on at some point as the rectified AC voltage increases from zero to a maximum and once the rectified AC voltage has increased to a non-zero value, thereby providing a current flow through the primary winding and hence a current flow through the secondary winding, and wherein the switch is arranged to switch off before the rectified AC voltage starts to increase again.

The main power supply supplies the power (to the device itself and also to the control) during normal mode whereas the standby power supply supplies the power during standby mode to the control so that the control has the necessary power to switch on the main power supply when the device goes from standby mode to normal mode.

In the standby power supply, there is no current drain through the transformer windings until the switch is switched on. Once the switch is switched on, current from the AC supply is transferred to the primary winding and this provides a big enough voltage drop to provide the DC output voltage for the electrical device. The current limiter limits the current flow through the primary winding, so that the power consumption when in standby mode can be controlled.

In a first embodiment, the control may be a receiver for receiving instructions to switch on and off the main power supply. This may be the case when the electrical device is a device which requires power during normal mode for its own operation and power in standby mode for enabling the control to switch back to normal mode from standby mode. Examples of this type of device are a washing machine, radio or microwave oven. The receiver may be a remote control receiver for receiving remote instructions to switch on and off the main power supply. This may be the case for an electrical appliance which is operable in normal mode and standby mode and can be switched between the two modes by the use of a remote control, for example a television, DVD player or a radio or another type of electrical device having normal and standby modes.

In a second embodiment, the electrical device is an external power supply for an electrical appliance, the device operating in normal mode when the electrical appliance is electrically connected to the device and the device operating in standby mode when the electrical appliance is not electrically connected to the device. Some examples of such external power supplies are a charger for a telephone (either a mobile cellular telephone or a portable landline telephone) and an AC adaptor. Other types of external power supplies are also envisaged.

If the electrical device is an external power supply, the control may be a sensor for sensing when the electrical appliance is electrically connected to the device. Thus, when the sensor senses that the electrical appliance is electrically connected to the device (e.g. when a telephone is placed in the cradle for charging), it may be arranged to switch on the main power supply using power provided by the standby power supply. When the sensor senses that the electrical appliance is no longer electrically connected (e.g. the telephone has been removed from the charging cradle), it may be arranged to switch off the main power supply, at which time, the power will be provided by the standby power supply.

According to the third aspect of the invention, there is also provided an external power supply for an electrical appliance, the external power supply being connectable to an AC voltage supply and operable in normal mode when the electrical appliance is electrically connected to the external power supply and in standby mode when the electrical appliance is not electrically connected to the external power supply, the external power supply comprising:
- a main power supply for providing power during normal mode;
- a sensor for sensing when the electrical appliance is electrically connected to the external power supply and for switching the main power supply on and off; and
- a standby power supply for providing power, during standby mode, to the sensor for switching on the main power supply, the standby power supply comprising:
- a) a transformer comprising a primary winding on a primary side and a secondary winding on a secondary side, the primary winding being connectable to an AC voltage supply and circuitry on the secondary side being arranged to provide a DC output voltage for the electrical device;
- b) a switch between the primary winding of the transformer and the AC voltage supply;
- c) a rectifier for rectifying the AC voltage; and
- d) a current limiter;

wherein the switch is arranged to switch on at some point as the rectified AC voltage increases from zero to a maximum and once the rectified AC voltage has increased to a non-zero value, thereby providing a current flow through the primary winding and hence a current flow through the secondary winding, wherein the current limiter is arranged to limit the amount of current flowing through the primary winding, and wherein the switch is arranged to switch off before the rectified AC voltage starts to increase again.

Some examples of electrical devices have been given but it will be understood by the skilled reader that the invention finds application with many different devices, not just those listed. In addition it should be understood that features which are described in relation to one aspect of the invention may also be applicable to another aspect of the invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, of which:

FIG. 3 is a graph of the voltage at node 200 of FIG. 2 over time;

FIG. 4a is a graph of the voltage across primary winding of transformer X1 of FIG. 2 over time;

FIG. 4b is a magnified view of one cycle of FIG. 4a;

FIG. 5a is a graph of the current drain through primary winding of transformer X1 of FIG. 2 over time;

FIG. 5b is a magnified view of one cycle of FIG. 5a;

FIG. 6a is a graph of the voltage across secondary winding of transformer X1 of FIG. 2 over time;

FIG. 6b is a magnified view of one cycle of FIG. 6a;

FIG. 7 is a graph of the voltage at output node 206 of FIG. 2 over time;

FIG. 15 is a graph of the voltage at node 200 of FIG. 14 over time;

FIG. 16 is a graph of the voltage at node 201 of FIG. 14 over time;

FIG. 17 is a graph of the voltage at node 202 of FIG. 14 over time;

FIG. 18 is a graph of the voltage at node 203 of FIG. 14 over time;

FIG. 19 is a graph of the voltage across primary winding of transformer X1 of FIG. 14 over time;

FIG. 20 is a graph of the voltage across secondary winding of transformer X1 of FIG. 14 overtime;

DETAILED DESCRIPTION OF PREFERRED EMBODIMENTS

Figure 1:
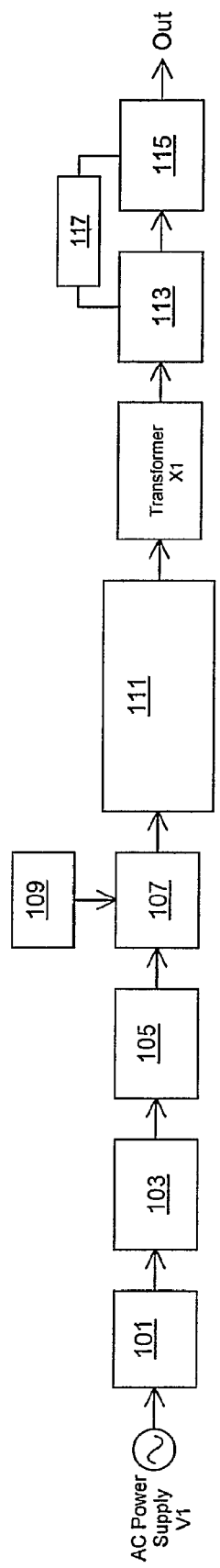
FIG. 1 is a block diagram of a first embodiment of the invention.
Figure 2:
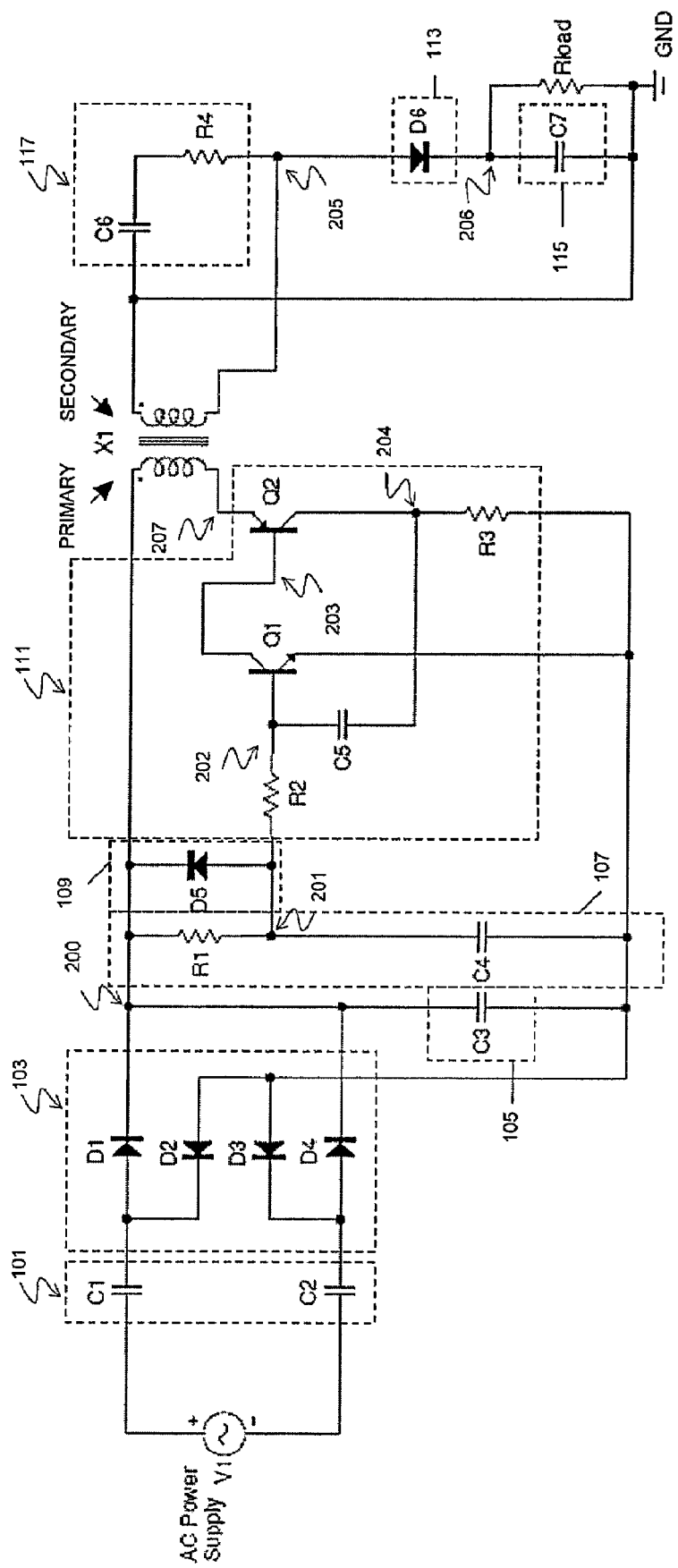
FIG. 2 shows a circuit implementation of the first embodiment of the invention shown in FIG. 1.

FIG. 1 is a block diagram of a first embodiment of the invention and FIG. 2 shows a circuit implementation of that embodiment.

Referring to FIGS. 1 and 2, the input is AC power supply V1. The AC power supply may be any AC voltage at any frequency e.g. 110 VAC, 120 VAC, 230 VAC or 240 VAC at 50 or 60 Hz. The AC power supply V1 is connected to a current limiter 101 comprising two capacitors C1 and C2. As will be described, the power consumption may be controlled by changing the value of those capacitors. The AC signal is then rectified by rectifier 103 formed by four diodes D1, D2, D3 and D4. Note that the rectifier is a full-wave rectifier providing a DC output voltage with two maxima per AC cycle. Capacitor C3 acts as voltage limiter 105 to limit the voltage at node 200 in order to prevent the breakdown of the device due to exceedingly high voltages. If the circuit elements have a high breakdown voltage i.e. above the maximum of the AC supply peak voltage, then capacitor C3 may be omitted. Capacitor C3 will be discussed further below.

Arrangement 111 is a switch located between the AC power supply and the primary winding of transformer X1 so that, when the switch is on, there is a current drain through the primary winding and when the switch is off, there is no current drain through the primary winding. Resistor R1 and capacitor C4 together form RC timer 107 that controls the timing of the switching of the switch 111, as will be described below. In addition, resistor R1 is chosen to be large and capacitor C4 small so that there is minimal current drain to prevent loss. Diode D5 acts as timer reset 109 for the RC timer 107 by providing a discharge path for capacitor C4 when the AC signal at node 200 is low after the switch 111 is switched on.

The switch 111 is formed by two transistors Q1 and Q2, two resistors R2 and R3 and capacitor C5 and is connected to transformer X1. Switch 111 is arranged to switch on very quickly through the use of positive feedback. The advantages of fast switching on are discussed below.

At the secondary side of the transformer X1, diode D6 acts as a rectifier and capacitor C7 is a filter capacitor. Capacitor C7 charges up, to provide a steady state DC voltage at output node 206 for the load $R_{load}$.

The operation of the arrangement of FIG. 2 is as follows. During a first half cycle of operation, as the voltage of the rectified AC signal at node 200 rises, capacitors C1 and C2 are discharging (from the previous half cycle) and capacitor C4 (and capacitor C3 if present) is/are being charged up.

When the voltage at node 202 (which is also the base voltage of transistor Q1), is sufficiently high due to the charging up of capacitor C4 (this happens near the peak of the AC signal), the base-emitter of transistor Q1 is forward biased, causing transistor Q1 to switch on. As Q1 is switched on, the voltage at node 203, (which is also the base voltage of transistor Q2), drops. This causes transistor Q2 to switch on resulting in a rapid draining of current through the primary side of transformer X1 and through resistor R3, which means an increase in voltage at node 204. This rise in voltage is translated back to node 202 via the feedback capacitor C5. This means that the voltage at node 202 and consequently the base-emitter voltage of transistor Q1 rise even more rapidly, causing more current to conduct through collector-emitter of transistor Q1, leading to even more current drain through emitter-collector of transistor Q2 and a further voltage increase at node 204. That is, the arrangement provides a system of positive feedback which produces very fast switching on.

The reason that fast switching is advantageous is in order to reduce losses in the switch itself. As the switch 111 is switched on, a current flows through the switch. Voltage present across the switch (in this case especially the emitter-collector voltage of transistor Q2) will result in losses. Ideally the switch should switch on instantaneously so that the time to drop the voltage across the switch to ground is instantaneous. (The voltage across the switch is indicated at node 207.) However, in practice, instantaneous switching is not possible but fast switching will shorten the time to drop the voltage across the switch which will, in turn, reduce losses. Thus, using positive feedback to increase the switching speed, reduces loss in the switch itself.

As described, once the rectified signal voltage is at or near its peak, the switch 111 is switched on. This closes the circuit and causes a rapid rush of current through the primary side of the transformer X1 and through C1 and C2, which charges C1 and C2. When this happens, the voltage at node 200 falls rapidly to ground because node 200 is shorted to ground through the primary winding of the transformer X1 when switch 111 is switched on and because the capacitors C1 and C2 in the AC input line act as impedances and there is a voltage drop across C1 and C2 when node 200 falls to ground. Once C1 and C2 are fully charged, the current stops flowing (i.e. the switch is effectively switched off). This limits the amount of current to the primary winding of the transformer in each cycle.

While switch 111 is on, capacitors C3 and C4 are discharging through the primary winding of the transformer X1. Once capacitor C4 has discharged, the RC timer 107 is reset and the RC timer 107 and switch 111 await the next peak from the rectified AC signal at node 200 in the next half cycle. During the next half cycle, as the rectified AC signal increases from zero to a maximum, capacitors C1 and C2, which are now charged up, can discharge. As already mentioned, resistor R1 is selected to be large so that negligible current is drained through it. Thus, all the current will be drained through the primary side of transformer X1, keeping losses to a minimum. It will be appreciated that the direction of the voltages across C1 and C2 alternates in each half cycle because of the direction of the original AC signal.

The short pulse of current drain in the primary side of the transformer X1 results in a corresponding pulse of current flow through the secondary side of transformer X1. At the secondary side of the transformer X1, diode D6 acts as a rectifier and capacitor C7 is a filter capacitor. At each half cycle of operation, there is a current pulse through the secondary side of the transformer X1 and capacitor C7 is charged up bit by bit due to those current pulses until a steady state DC voltage is reached at output node 206. This DC voltage is provided to the load $R_{load}$. ($R_{load}$ may, for example, be a remote control receiver which requires power during standby mode.) The output node 206 provides the necessary output voltage. The value of capacitor C7 is appropriately chosen to ensure the proper functioning of $R_{load}$ at the required voltage.

As already mentioned, once capacitors C1 and C2 are fully charged, current stops flowing through the windings. Thus, the value of capacitors C1 and C2 can be chosen to set the current flow through the windings to a desired level. This controls the amount of power consumed.

Note that it is important, in this embodiment, that the diode D5 is present as this enables the switch to reset each cycle. If the diode D5 were not present, the switch 111 would never reset so the arrangement would not work, because, after switching on the first time, it would not switch off and the arrangement would simply work like the prior art arrangements with a constant current drain through the transformer windings and insufficient voltage across the windings to supply DC output voltage. (However, note the alternative method of resetting according to the third embodiment of the invention illustrated in FIG. 12.)

Also note that it is preferable that the switch 111 switches on as close to the peak of the AC signal as possible. This creates a maximum voltage peak across the windings when switch 111 is switched on. If the switch 111 were to switch on at the start of the AC signal (i.e. when the AC voltage is at zero), the arrangement would not work as it would simply be as if the switch were not there, and there would be no sudden in rush of current from the AC supply and the capacitor C4 (and C3 if present) would not have time to charge up. That is, the switch must switch on once the rectified AC signal has increased a bit, and the switch preferably switches on close to the peak of the rectified AC signal as this maximizes the voltage peak.

As already mentioned, C3 acts as a voltage limiter and, in certain circumstances, may be omitted. However, if C3 is present, it will charge up, along with C4, as the rectified AC signal increases to its peak. Thus when switch 111 is switched on, the energy stored in both C4 and C3 is transferred across to the transformer windings. In practice, the contribution from C4 (and C3 if present) to the voltage peak is minimal; the voltage peak is primarily provided by the in rush of current directly from the AC supply.

Capacitor C6 and resistor R4 together form snubber circuit 117. The function of snubber circuit 117 is to reduce the ringing due to the transience caused by the switching. This is added in practical applications to reduce electromagnetic emission from the circuit due to this ringing, but the arrangement will still operate without the snubber circuit 117.

FIGS. 3, 4a, 4b, 5a, 5b, 6a, 6b and 7 show various properties with respect to time at points on the circuitry of FIG. 2. The figures illustrate the processes taking place during each AC cycle as the voltage at the output node is rising to a steady state voltage.

FIG. 3 is a graph of the voltage at node 200 over time. In each cycle, the voltage at node 200 rises to a peak. Then, when the switch 111 switches, resulting in current drain through primary side of transformer X1, the voltage at node 200 drops to ground. In this example, it can be seen that each cycle takes 10 ms i.e. the frequency of the rectified AC signal is 100 Hz so the AC power supply operates at 50 Hz.

FIG. 4a is a graph of the voltage across primary winding of transformer X1 over time. In each cycle, there is a voltage peak corresponding to the current drain through primary side of transformer X1 as switch 111 is switched. The voltage peaks shown in FIG. 4a are very spiky. Of course, the voltage peaks are not instantaneous and a magnified view of one cycle of FIG. 4a is shown in FIG. 4b. Note that, with this arrangement, the voltage peaks are large (much larger than they would be with the prior art arrangements which have no switch between the transformer primary winding and the AC supply) so that the DC output voltage can be provided to the load.

FIG. 5a is a graph of the current through primary winding of transformer X1 over time. In each cycle, there is a spiky current drain as switch 111 switches. The current drain peaks correspond to the voltage peaks of FIG. 4a. Of course, the current drains are not instantaneous and a magnified view of one cycle of FIG. 5a is shown in FIG. 5b. The length of time of the current drain through the primary winding is determined by the supply voltage, the inductance in the transformer winding and, if C3 (voltage limiter) is present, by capacitance C3.

With each current drain through primary winding of transformer X1, there is a corresponding current pulse through secondary winding of transformer X1. FIG. 6a is a graph of the voltage across secondary winding of transformer X1 over time. It can be seen that, in each cycle, there is a voltage peak corresponding to the current pulse. FIG. 6b shows a magnified view of one cycle of FIG. 6a.

As described, with each current pulse through secondary winding of transformer X1, the capacitor C7 charges up a little bit i.e. the voltage at node 206 increases a little bit. That is, over several cycles, the capacitor C7 charges up bit by bit and the voltage at node 206 increases bit by bit. FIG. 7 is a graph of the voltage at node 206. It can be seen that the voltage at output node 206 rises at each switching cycle and ultimately reaches a steady state DC voltage.

Figure 8:
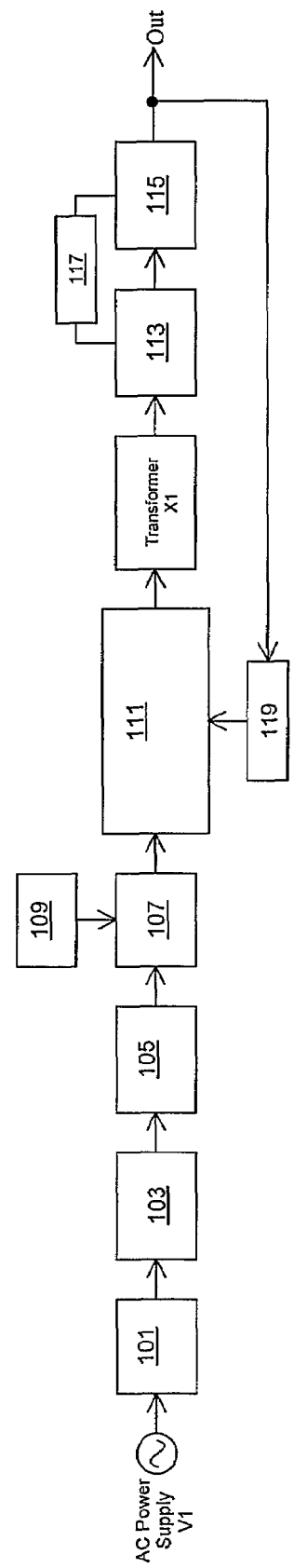
FIG. 8 is a block diagram of a second embodiment of the invention.
Figure 9:
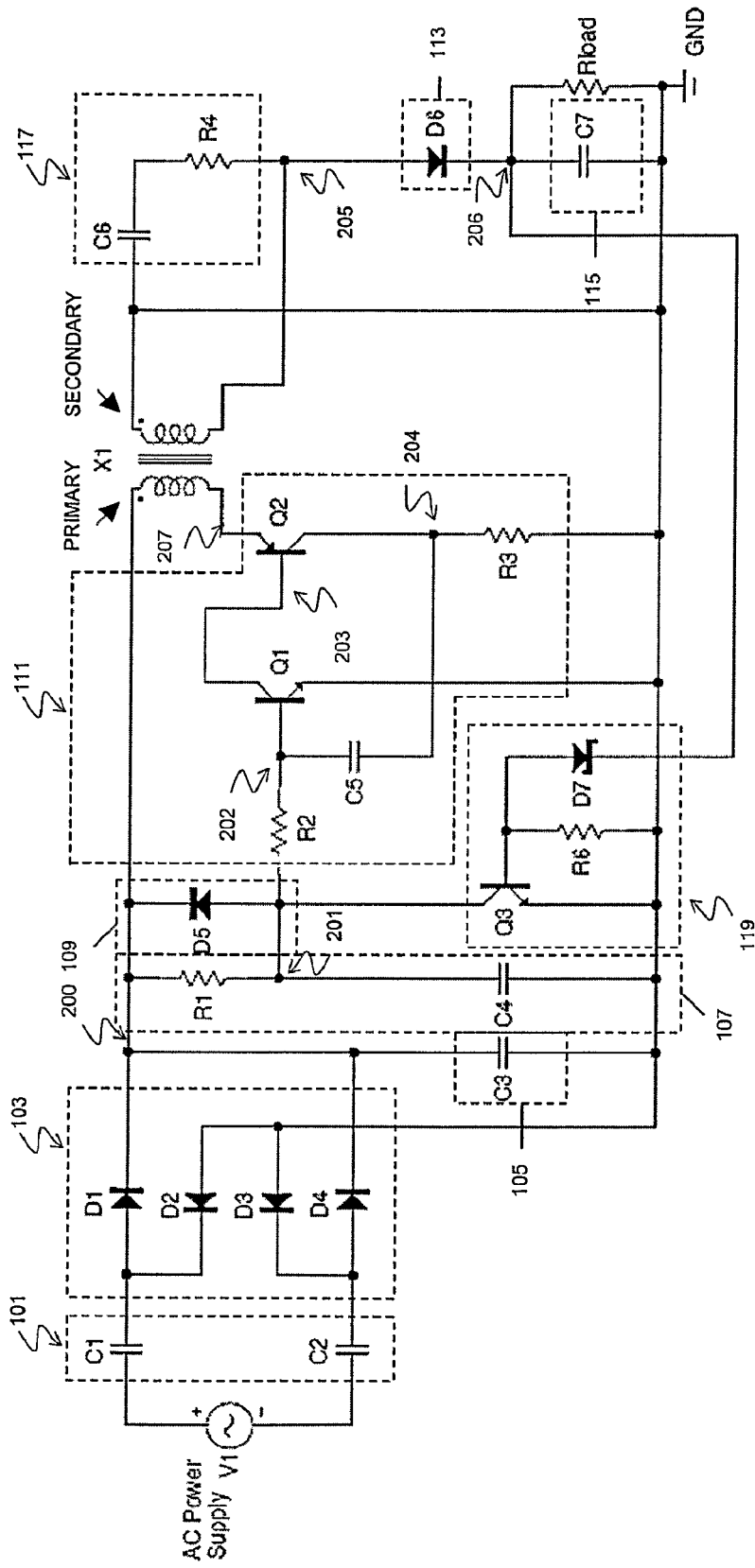
FIG. 9 shows a first circuit implementation of the second embodiment of the invention shown in FIG. 8.

FIG. 8 is a block diagram of a second embodiment of the invention and FIG. 9 shows a first circuit implementation of that embodiment.

It can be seen that the second embodiment illustrated in FIG. 8 is the same as the first embodiment except for the addition of regulator 119. That is, in summary, the arrangement includes AC power supply V1, current limiter 101 (effected by two capacitors C1 and C2), rectifier 103 (effected by four diodes D1, D2, D3 and D4), voltage limiter 105 (capacitor C3), RC timer 107 (effected by resistor R1 and capacitor C4) and timer reset 109 (diode D5) for switch 111 (effected by transistors Q1 and Q2, resistors R2 and R3 and capacitor C5), transformer X1, rectifier 113 (diode D6), filter 115 (capacitor C7) and optional snubber circuit 117 (effected by capacitor C6 and resistor R3).

The arrangement additionally includes regulator 119. The function of regulator 119 is to reduce the fluctuation of the DC voltage at the output (node 206) to the load. This is important for loads that require good power supply voltage regulation.

FIG. 9 shows a first circuit implementation of the FIG. 8 embodiment. In this implementation, the regulator 119 consists of a transistor Q3, a resistor R6 and a zener diode D7. If the output voltage at node 206 (see FIG. 7) becomes too high, the zener diode D7 will break down. This will forward bias the base emitter of transistor Q3, causing transistor Q3 to switch on. By switching on Q3, the charging of C4 will be stopped as current is drained to ground through resistor R1 and transistor Q3. In effect, the RC timer 107 and consequently switch 111 are switched off. As such, the transfer of energy from the primary side to the secondary side of the transformer X1 temporarily ceases, consequently stopping the capacitor C7 from charging, until the output voltage at node 206 drops to below the breakdown voltage of the zener diode D7.

Figure 10:
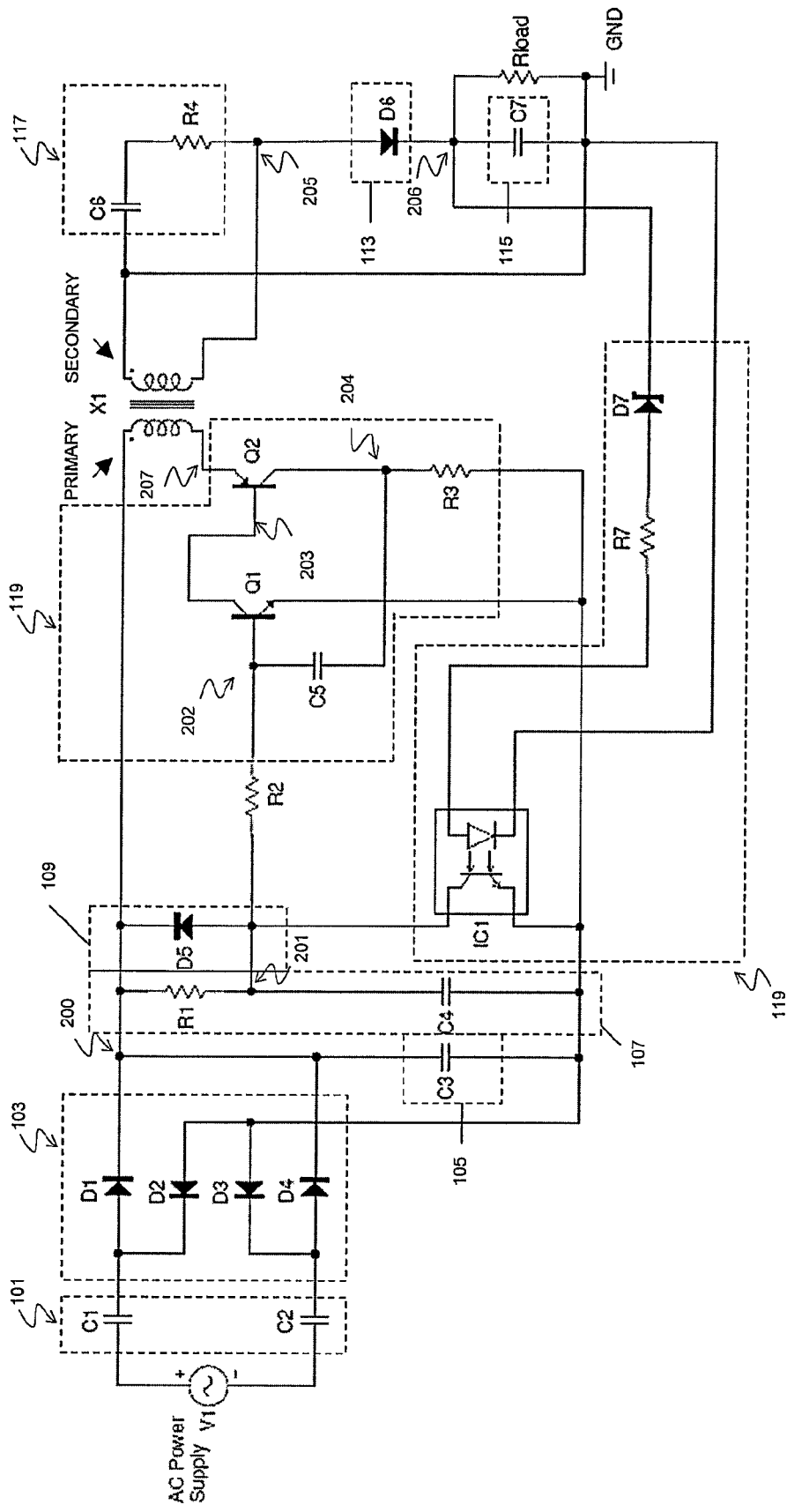
FIG. 10 shows a second circuit implementation of the second embodiment of the invention shown in FIG. 8.

FIG. 10 shows a second circuit implementation of the FIG. 8 embodiment. In this implementation, transistor Q3 is replaced by optocoupler IC1 in the regulator 119 and resistor R6 and zener diode D7 are appropriately connected. Using an optocoupler is advantageous because there is then no physical connection between the primary and secondary sides of the circuit. The optocoupler functions as a switch in the circuit just like transistor Q3 in FIG. 9. When the voltage at output node 206 is sufficiently high such that zener diode D7 breaks down, the light emitting diode (LED) within the optocoupler emits light and the phototransistor within it is turned on. This causes current to be drained to ground through resistor R1 and the phototransistor of the optocoupler.

As already mentioned, the optocoupler means that the primary and secondary sides of the circuit are not physically connected as the switching function is achieved using light. Using an optocoupler may be more acceptable for safety requirements (because there is such a high tension on the primary side of the circuit) as the two sides of the circuit are then isolated.

Figure 11:
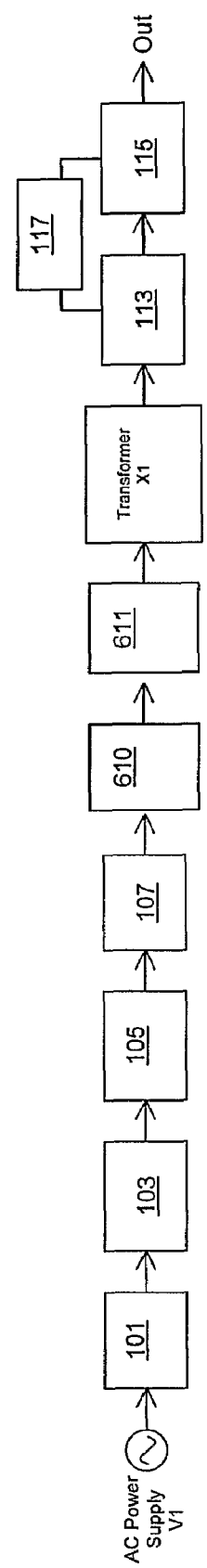
FIG. 11 is a block diagram of a third embodiment of the invention.
Figure 12:
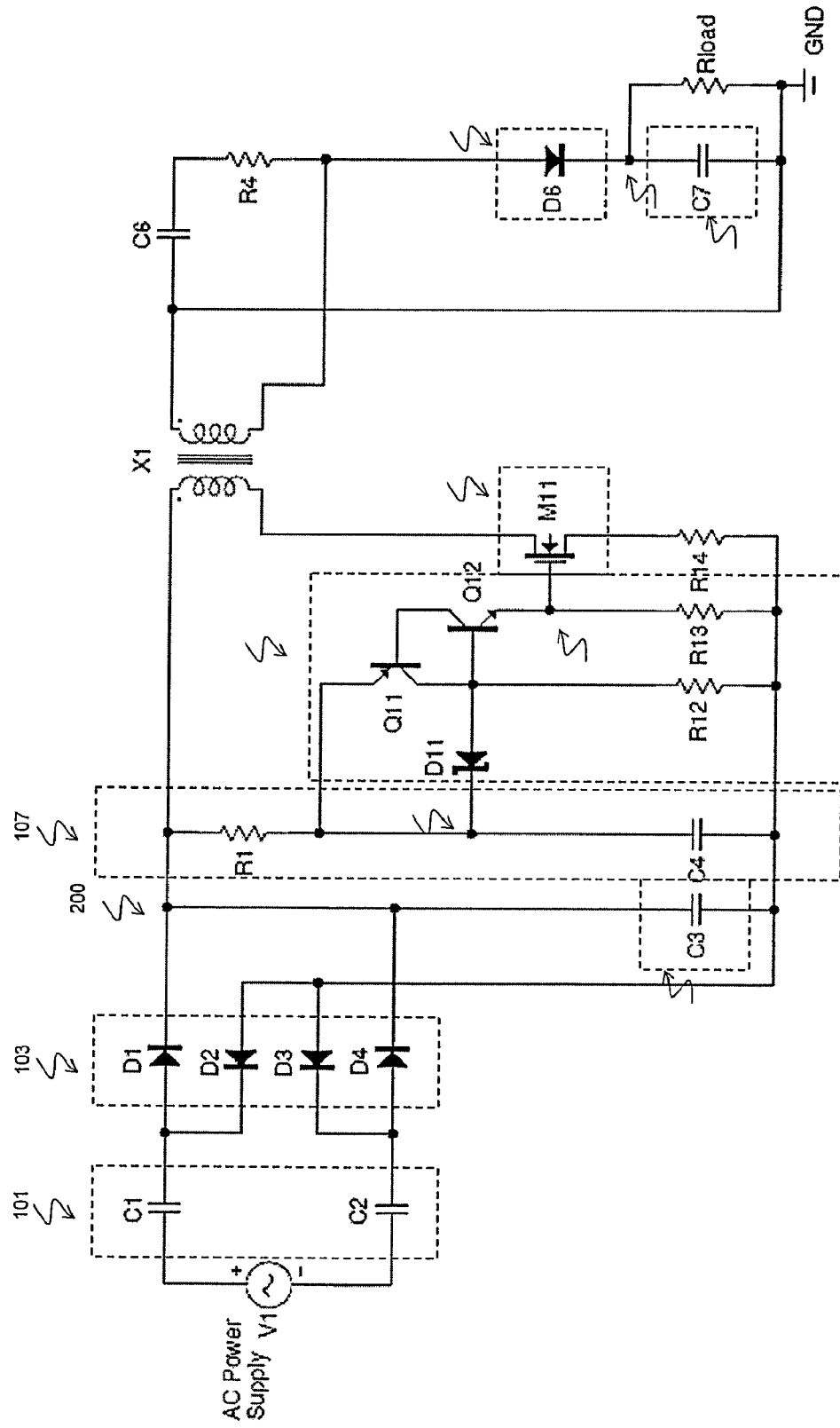
FIG. 12 shows a circuit implementation of the third embodiment of the invention shown in FIG. 11.

FIG. 11 is a block diagram of a third embodiment of the invention and FIG. 12 shows a circuit implementation of that embodiment.

It can be seen that the third embodiment illustrated in FIG. 11 is the same as the first embodiment except that timer reset 109 is no longer required and switch controller 610 and MOSFET switch 611 replace switch 111. That is, in summary, the arrangement includes AC power supply V1, current limiter 101 (effected by two capacitors C1 and C2), rectifier 103 (effected by four diodes D1, D2, D3 and D4), voltage limiter 105 (capacitor C3), RC timer 107 (effected by resistor R1 and capacitor C4), transformer X1, rectifier 113 (diode D6), filter 115 (capacitor C7) and optional snubber circuit 117 (effected by capacitor C6 and resistor R 4). The arrangement additionally includes MOSFET switching device 611 between the AC power supply and the primary winding and switch controller 610. Sections of the arrangement which are the same as the FIGS. 1 and 2 arrangement will not be discussed in detail again.

Arrangement 611 is a MOSFET switching device located between a rectified AC voltage and the primary winding of transformer X1 so that, when the switch is on, there is a current drain through the primary winding and when the switch is off, there is no current drain through the primary winding. Resistor R1 and capacitor C4 together form RC timer 607 that controls the timing of the switching of the switch 611 through switch controller 610, as will be described below. In addition, resistor R1 is chosen to be large and capacitor C4 small so that there is minimal current drain to prevent loss. The switch controller 610 (formed by two transistors Q11 and Q12, a Zener diode D11, and two resistors R12 and R13) is connected to transformer X1. The transistors Q11 and Q12 form a thyristor device.

The operation of the arrangement of FIGS. 11 and 12 is as follows. During a first half cycle of operation, as the voltage of the rectified AC signal at node 200 rises, capacitors C1 and C2 are discharging (from the previous half cycle) and capacitor C4 (and optional capacitor C3) is/are being charged up. When the voltage at node 702 is sufficiently high, due to the charging up of capacitor C4 (this happens near the peak of the AC signal), the thyristor device will switch on as the voltage across C4 rises sufficiently high above the breakdown voltage of the Zener diode D11 to forward bias the base emitter of Q12. Subsequent to the switching on of the thyristor device, the switch 611 is switched on. The switch 611 remains on until C4 has discharged through the thyristor device and the voltage at node 703 drops below a gate threshold voltage of the switch 611. This cycle is subsequently repeated consecutively.

As described, once the rectified signal voltage is at or near its peak, the switch 611 is switched on. This closes the circuit and causes a rapid rush of current through the primary side of the transformer X1 and through C1 and C2, which charges C1 and C2. When this happens, the voltage at node 200 falls rapidly to ground because node 200 is shorted to ground through the primary winding of the transformer X1 when switch 611 is switched on, and because the capacitors C1 and C2 in the AC input line act as high impedances. There is a voltage drop across C1 and C2 when node 200 falls to ground. Once C1 and C2 are fully charged, the current stops flowing (i.e. the switch is effectively switched off). This limits the amount of current to the primary winding of the transformer in each cycle.

While switch 611 is on, capacitor C3 discharges through the primary winding of the transformer X1. Once capacitor C4 has discharged through the thyristor device, the RC timer 607 is reset and the RC timer 607 and switch 611 await the next peak from the rectified AC signal at node 200 in the next half cycle. During the next half cycle, as the rectified AC signal increases from zero to a maximum, capacitors C1 and C2, which are now charged up, can discharge. As already mentioned, resistor R1 is selected to be large so that negligible current is drained through it. Thus, all the current will be drained through the primary side of transformer X1, keeping losses to a minimum. It will be appreciated that the direction of the voltages across C1 and C2 alternates in each half cycle because of the direction of the original AC signal.

As with the other embodiments, the short pulse of current drain in the primary side of the transformer X1 results in a corresponding pulse of current flow through the secondary side of transformer X1 so that capacitor C7 is charged up bit by bit due until a steady state DC voltage is reached at output node 206. This DC voltage is provided to the load $R_{load}$.

As already mentioned, once capacitors C1 and C2 are fully charged, current stops flowing through the windings. Thus, as in the other embodiments, the value of capacitors C1 and C2 can be chosen to set the current flow through the windings to a desired level. This controls the amount of power consumed.

As before, note that it is preferable that the switch 611 switches on as close to the peak of the AC signal as possible. This creates a maximum voltage peak across the windings when switch 611 is switched on. If the switch 611 were to switch on at the start of the AC signal (i.e. when the AC voltage is at zero), the arrangement would not work as it would simply be as if the switch 611 were not there, and there would be no sudden in rush of current from the AC supply and the capacitor C4 (and C3 if present) would not have time to charge up. That is, the switch 611 must switch on once the rectified AC signal has increased a bit, and the switch 611 preferably switches on close to the peak of the rectified AC signal as this maximizes the voltage peak.

As already mentioned, C3 acts as a voltage limiter and, in certain circumstances, may be omitted. However, if C3 is present, it will charge up, along with C4, as the rectified AC signal increases to its peak. Thus when switch 611 is switched on, the energy stored in C3 is transferred across to the transformer windings.

Figure 13:
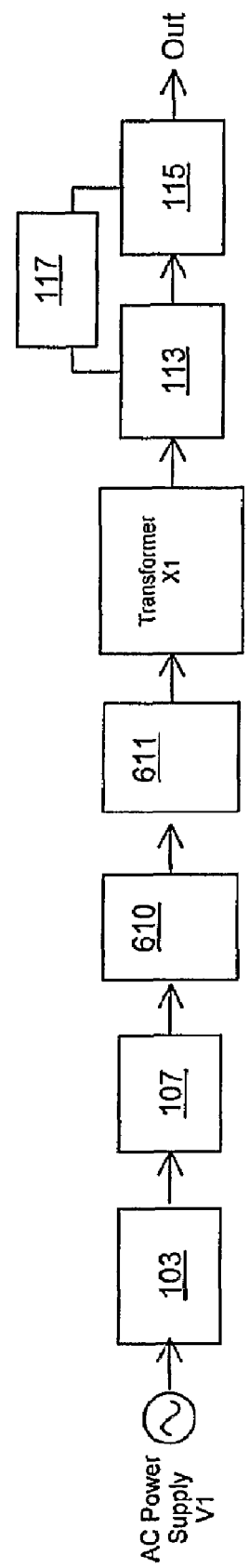
FIG. 13 is a block diagram of a fourth embodiment of the invention.
Figure 14:
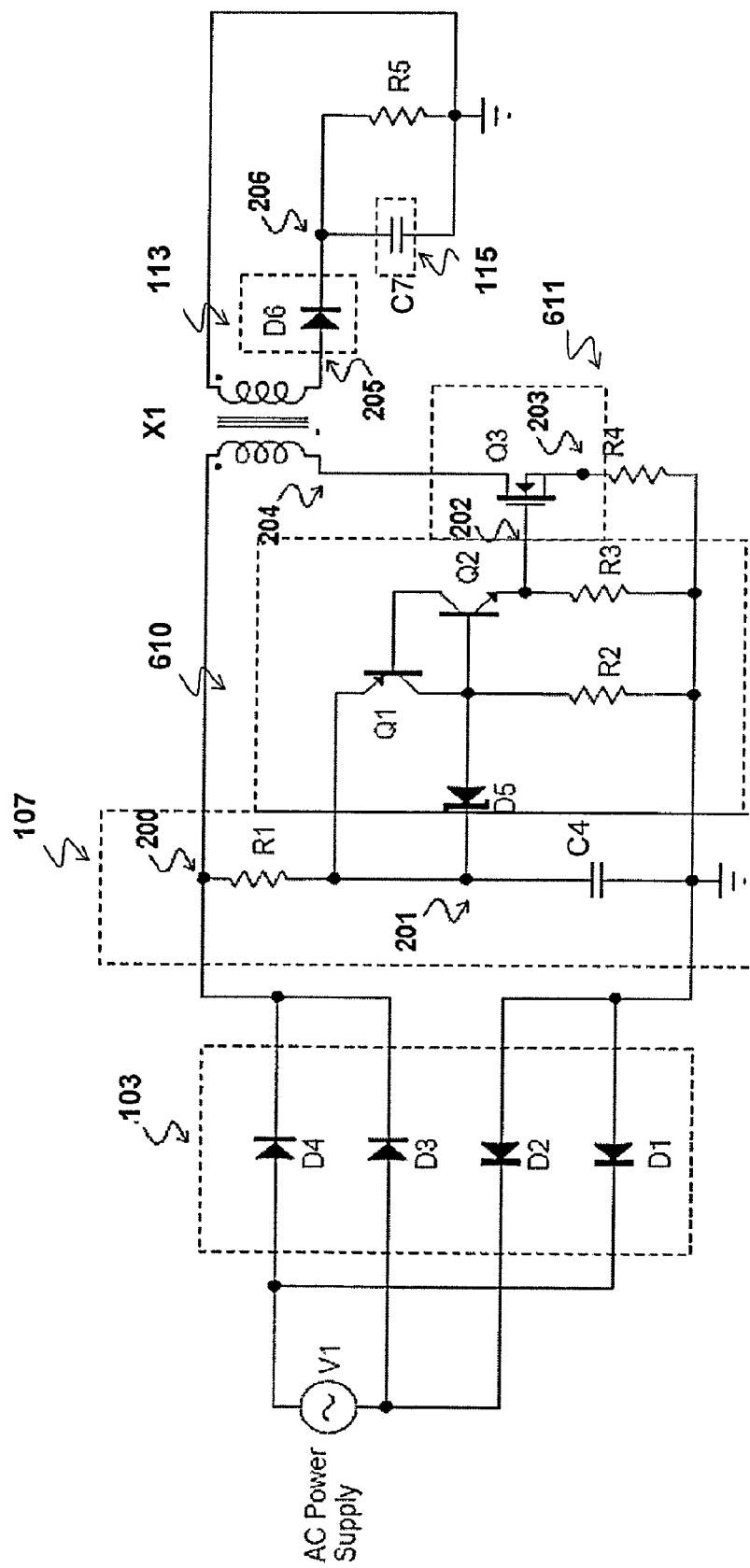
FIG. 14 shows a circuit implementation of the fourth embodiment of the invention shown in FIG. 13.

FIG. 13 is a block diagram of a fourth embodiment of the invention and FIG. 14 shows a circuit implementation of that embodiment.

It can be seen that the fourth embodiment illustrated in FIG. 13 is the same as the third embodiment except that current limiter 101, and voltage limiter 105 are omitted from the circuit. In summary, the arrangement includes AC power supply V1, rectifier 103 (effected by four diodes D1, D2, D3 and D4), RC timer 107 (effected by resistor R1 and capacitor C4), transformer X1, rectifier 113 (diode D6), filter 115 (capacitor C7) and optional snubber circuit 117 (effected by a capacitor and a resistor). In this embodiment, the rectifier 103 may be a half-wave rectifier which only comprises a single diode. The MOSFET switching device 611 and switch controller 610 of the third embodiment are also present in the fourth embodiment. Sections of the circuit which have been described in prior embodiments will not be discussed in detail again.

FIGS. 15, 16, 17, 18, 19, and 20 show various characteristics of the circuit with respect to time at points on the circuit of FIG. 14. The figures illustrate the circuit characteristics taking place during each AC cycle as the voltage at the output node is rising to a steady state voltage. Reference will be made to FIGS. 15, 16, 17, 18, 19, and 20 when describing the operation of the fourth embodiment.

FIG. 15 is a graph of the voltage at node 200 over time. When voltage at node 200 starts to rise from zero, capacitor C4 of RC timer 107 is charged through resistor R1. When the voltage across C4 (voltage at node 201 shown in FIG. 16) reaches the breakdown voltage of the Zener diode D5, the thyristor device formed by Q1 and Q2 is switched on and subsequently, the switch Q3 is also switched on. In order to maximise the available power output, switch Q3 may be preferably switched on when the voltage at node 200 attains its peak value. This synchronisation may be attained by varying the time constant of the RC timer 107.

Once the thyristor device is switched on, it continuously drains current from C4 and R1. As R1 is of high resistance and C4 is of low capacitance, the voltage across C4 (at node 201) drops quickly as shown in FIG. 16.

In order to enable the charging of C4 during a next cycle, the thyristor device has to be switched off before the start of the next cycle. This switching off of the thyristor device occurs when the voltage at node 200 drops to a value which is unable to provide enough current through R1 for the thyristor device to remain in operation.

Referring to FIG. 17, it can be seen that when the thyristor device is switched on, the gate voltage of MOSFET Q3 (node 202) rises sharply and consequently turns Q3 on. When Q3 is "on", current flows through the primary winding of transformer X1. As such, energy is stored in the form $E=\frac{1}{2}LI^2$, where E is energy stored, L is inductance of the primary winding of the transformer and I is current passing through the primary winding.

As the current flowing in the primary winding increases, the voltage across R4 (node 203) demonstrates a ramp-like pattern (FIG. 18). When in operation, the gate voltage of Q3 decreases while its source voltage increases. Q3 switches off when the difference between the gate and source voltages drops below its threshold voltage. Once Q3 switches off, the energy stored in the primary winding is transferred to the secondary winding. FIGS. 19 and 20 show the voltages across the primary and secondary windings of transformer X1 respectively.

It should be noted that Q3 switches on and off only once during half an AC cycle. FIG. 15 shows switching taking place at a frequency of approximately 120 Hz. Therefore, this and the aforementioned embodiments of the present invention have lower switching losses compared with conventional switching mode power supplies which operate at higher frequencies.

Figure 21:
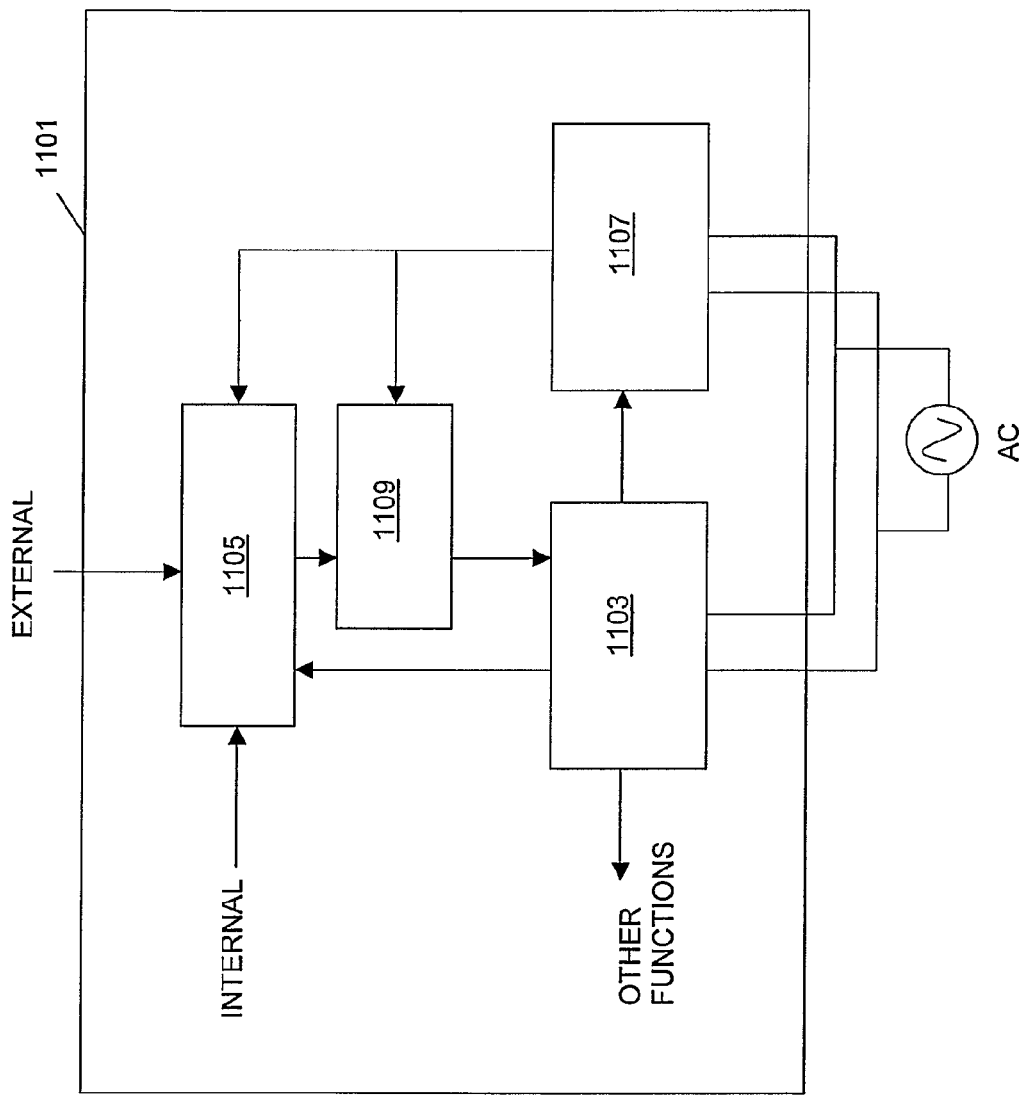
FIG. 21 shows the standby power supply of the invention in use in a first application.
Figure 22:
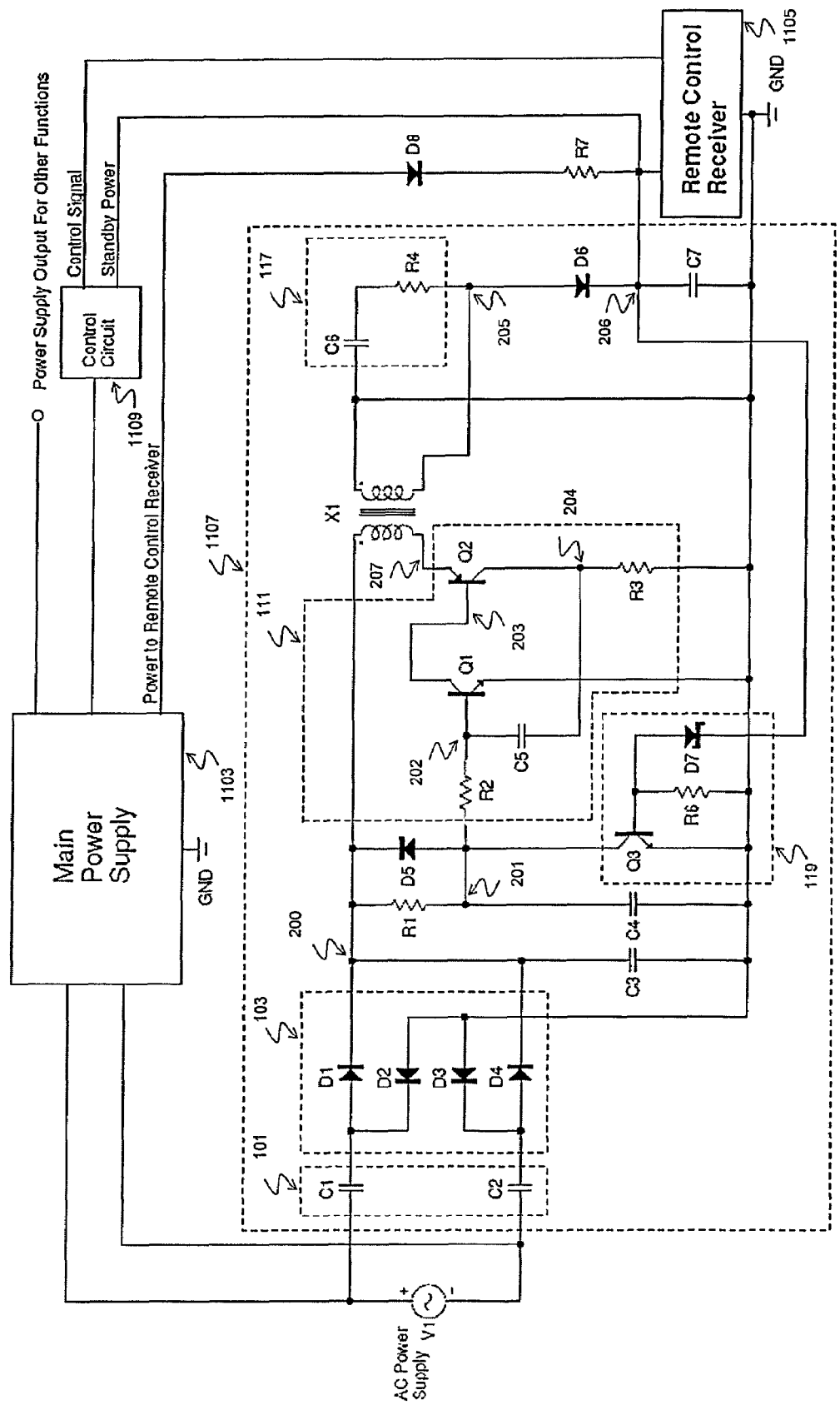
FIG. 22 shows the first application as shown in FIG. 21 including the second embodiment of the invention as shown in FIG. 8.

FIG. 21 shows the power supply of the invention in use in a first application and FIG. 22 shows that application including the second embodiment of the invention (as shown in FIG. 8). FIGS. 21 and 22 show the power supply used as a standby power supply in an electrical appliance, for example a television or washing machine. The appliance is directly connected to an AC power supply for providing power for its own operation during normal use.

Figure 23:
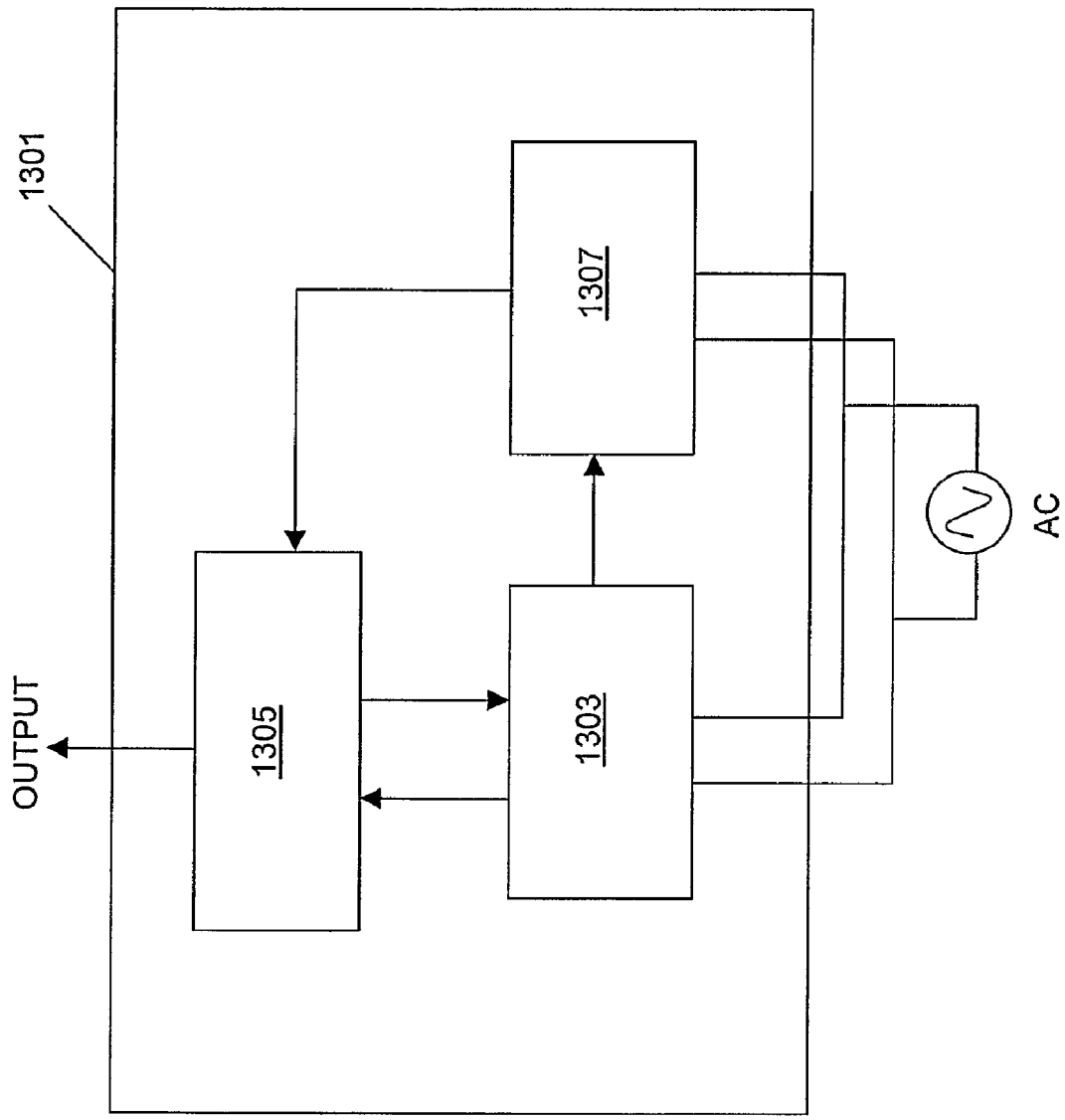
FIG. 23 shows the standby power supply of the invention in use in a second application.

(FIG. 23 shows the power supply used in an external power supply, for example a mobile cellular telephone charger, and will be discussed below.)

FIG. 21 shows an appliance 1101 which is connected to an AC power supply (e.g. mains supply). The appliance operates from a main power supply when in operational mode but is able to be switched from operational mode to standby mode and vice-versa. The appliance 1101 typically has a main power supply 1103 and some form of control. In this case, the control function is implemented using a remote control receiver 1105 in the appliance, which may have external control means (e.g. the remote control) and internal control means (e.g. automatic standby after some period of idle). The appliance also includes a power supply 1107 according to the invention for supplying power during standby mode and a control circuit 1109.

Operation of the arrangement will now be described in general terms. During normal operation of the appliance 1101, the main power supply 1103 provides power to the remote control receiver 1105 and for other functions of the appliance. When an instruction is given to the remote control receiver 1105 to put the system into standby mode, main power supply 1103 can be shut down and the remote control receiver 1105 can control the main power supply 1103 to switch off via control circuit 1109. The supply of power during standby mode to remote control receiver 1105 will then be taken over by standby power supply 1107 so that the remote control receiver 1105 can wait for the instruction to switch on the system. When an instruction is passed to switch on the system through remote control receiver 1105, standby power supply 1107 can also provide the power to switch on the main power supply 1103 via control circuit 1109 and the remote control receiver 1105 can control the main power supply 1103 to switch on via control circuit 1109.

FIG. 22 shows the arrangement of FIG. 21 using the power supply of FIG. 8 (i.e. the second embodiment already described) as the standby power supply 1107 and operation in more specific terms will now be described.

FIG. 22 shows an AC power supply connected to main power supply 1103 and standby power supply 1107. The main power supply 1103 is connected to an output for the main functions of the appliance when in normal operation. The main power supply is also connected to control circuit 1109 which is connected to the output node 206 of standby power supply 1107 and to the remote control receiver 1105 which acts as the load for standby power supply 1107. The main power supply 1103 also supplies power to the micro-controller within the remote control device.

When the main power supply 1103 is on (i.e. during normal operation), the voltage supplied to the remote control receiver 1105 at output node 206 is set to be slightly higher than the breakdown voltage of the zener diode D7 in regulator 119. This will cause the base-emitter of transistor Q3 in regulator 119 to be forward biased, causing transistor Q3 to switch on. This means that current will be drained to ground via resistor R1 and transistor Q3 so that charging of capacitor C4 is prevented. Thus, the RC timer 107 and consequently the switch 111 are both switched off. This means that, during normal operation when the main power supply 1103 is switched on, the standby power supply 1107 is switched off.

When the main power supply 1103 is off (i.e. during standby operation), the voltage at output node 206 will drop below the breakdown voltage of zener diode D7. As transistor Q3 is switched off, the RC timer 107 will be switched on and the switch 111 will activate i.e. proceed to switch on and off twice during each AC cycle in accordance with the RC timer 107 and timer reset 109, so as to provide a pulsed current drain through the secondary winding and thereby steadily charge up the capacitor C7. This means that, when the main power supply 1103 is switched off, standby power supply 1107 will be switched on to provide power (DC voltage at output node 206) to the remote control receiver 1105 during standby mode. As already mentioned, the standby power supply 1107 may also provide power to switch on the main power supply 1103 via control circuit 1109 when there is an instruction to switch on the system from the remote control receiver 1105.

FIG. 23 shows the power supply of the invention in use in a second application. FIG. 23 shows the power supply used within an external power supply. An external power supply is a device that takes input from the AC power supply and provides power supply, more commonly in the form of a DC voltage, to its load. An example of such an external power supply is a telephone charger.

FIG. 23 shows an external power supply 1301 for providing external power, which is connected to an AC power supply (e.g. mains supply). During normal operation, the main power supply 1303 will provide the power to the load at the output. Sensor 1305, which may be a current sensor, switches on the main power supply 1303 when a load is present (e.g. when a device to be charged is connected to the charger) and switches it off when the load is removed. During standby mode, the power is provided by the standby power supply 1307.

The arrangement works in a similar way to the arrangement described with reference to FIGS. 21 and 22. When the main power supply 1303 is switched on (i.e. during normal mode), the standby power supply 1307 is switched off. When the load is removed (i.e. during standby mode), the sensor switches off the main power supply 1303 and the standby power supply 1307 is switched on. The standby power supply 1307 provides the power for the sensor 1305 to switch on the main power supply 1303 from standby mode to normal mode when the load is connected to the external power supply 1301.

It can be seen from the above description that the invention provides a power supply with low power consumption. The power supply may be used in many applications where low power consumption is important. Some examples are as standby power supplies in electrical devices (e.g. in televisions, washing machines, microwaves, stereos and other devices which are operable in normal mode and standby mode), within external power supplies for supplying power to detect whether the electrical device is connected or not and to switch on the main power supply (e.g. within a portable telephone charger) or as standalone power supplies for electrical devices that require low power consumption, including low power external power supplies (e.g. a night light, plugged into the AC wall socket, to provide dim lighting). Other examples of applications may also be envisaged.

The power consumption of the described power supply can be very low and can certainly be as low as a few milliwatts, which, as already mentioned, is a typical power required to "wake up" a device from standby. This is in contrast to typical power consumption using conventional methods, which is commonly from several hundred milliwatts to several watts. The actual power supplied can be set according to requirements, by changing the values of the circuit components.

The invention claimed is:

1. A power supply for an electrical device, the power supply comprising: a) a transformer comprising a primary winding on a primary side and a secondary winding on a secondary side, the primary winding being connectable to a AC voltage supply and circuitry on the secondary side being arranged to provide a DC output voltage for the electrical device; b) a switch between the primary winding of the transformer and the AC voltage supply; and c) a rectifier for rectifying the AC voltage; wherein the switch is arranged to switch on at some point as the rectified AC voltage increases from zero to a maximum and once the rectified AC voltage has increased to a non-zero value, thereby providing a current flow through the primary winding and hence a current flow through the secondary winding, and wherein the switch is arranged to switch off before the rectified AC voltage staffs to increase again.

2. The power supply of claim 1, wherein the switch is arranged to switch on close to each peak of the rectified AC voltage.

3. The power supply of claim 1, further comprising a switch timer.

4. The power supply of claim 3, wherein the switch timer is coupled to a switch controller.

5. The power supply of claim 1, further comprising a current limiter arranged to limit the amount of current flowing through the primary winding.

6. The power supply of claim 5, wherein the current limiter comprises at least one charge storage device.

7. The power supply of claim 6, wherein the power supply is arranged such that current stops flowing through the primary winding once the at least one charge storage device of the current limiter has substantially fully charged.

8. The power supply of claim 3, wherein the switch timer is operable with a switch timer reset, the switch timer reset being arranged to reset the switch timer after the switch has been switched off.

9. The power supply of claim 1, further comprising a voltage limiter for preventing breakdown of the device at high voltages.

10. The power supply of claim 1, wherein the rectifier is arranged to full-wave rectify the AC voltage.

11. The power supply of claim 1, wherein the circuitry on the secondary side provides the output voltage for the electrical device via a charge storage device which charges up during each AC cycle.

12. The power supply of claim 1, wherein the current flows through the secondary winding when the switch is switched off.

13. A method for supplying power to an electrical device, the method comprising the steps of:
a) providing a transformer having a primary winding and a secondary winding, the primary winding being connected to an AC voltage supply via a switch; b) providing a rectifier for rectifying the AC voltage; c) as the rectified AC voltage increases from zero to a maximum, once the rectified AC voltage has increased to a non zero value, switching on the switch to provide a current flow through the primary winding and hence a current flow through the secondary winding; d) converting the current flow through the secondary winding to a DC output voltage for the electrical device; and e) switching off the switch before the rectified AC voltage staffs to increase again.

14. The method of claim 13, wherein step c) of switching on the switch comprises switching on the switch close to each peak of the rectified AC voltage.

15. The method of claim 13, wherein the current flowing through the primary winding is limited by a current limiter.

16. The method of claim 15, wherein the current limiter comprises at least one charge storage device.

17. The method of claim 16, wherein step e) of switching off the switch comprises switching off the switch once the charge storage device or devices of the current limiter have substantially fully charged.

18. The method of claim 13, further comprising the step of charging up a charge storage device as the rectified AC voltage increases from zero to a maximum.

19. The method of claim 18 wherein the charge storage device forms part of an RC timer for the switch.

20. An electrical device connectable to an AC voltage supply and operable in each of normal mode and standby mode, the electrical device comprising: a main power supply for providing power during normal mode; a control for switching the main power supply on and off and a standby power supply for providing power, during standby mode, to the control for switching on the main power supply, the standby power supply comprising:
a) a transformer comprising a primary winding on a primary side and a secondary winding on a secondary side, the primary winding being connectable to an AC voltage supply and circuitry on the secondary side being arranged to provide a DC output voltage for the electrical device; b) a switch between the primary winding of the transformer and the AC voltage supply; and c) a rectifier for rectifying the AC voltage; wherein the switch is arranged to switch on at some point as the rectified AC voltage increases from zero to a maximum and once the rectified AC voltage has increased to a non-zero value, thereby providing a current flow through the primary winding and hence a current flow through the secondary winding, and wherein the switch is arranged to switch off before the rectified AC voltage staffs to increase again.

21. The electrical device of claim 20, wherein the standby power supply further includes a current limiter arranged to limit the amount of current flowing through the primary winding.

22. The electrical device of claim 20, wherein the current flows through the secondary winding when the switch is switched off.

* * * * *